(12) United States Patent
Kurumagawa et al.

(10) Patent No.: US 9,024,236 B2
(45) Date of Patent: May 5, 2015

(54) APPARATUS FOR AND METHOD OF CONTROLLING GRIP HEATER

(75) Inventors: Hiroshi Kurumagawa, Anjo (JP); Hideyuki Moriwaki, Anjo (JP); Ryuichi Okai, Anjo (JP); Yasuo Oishi, Saitama (JP)

(73) Assignees: Honda Motor Co., Ltd., Tokyo (JP); Faltec Company Limited, Kawasaki-shi (JP)

( * ) Notice: Subject to any disclaimer, the term of this patent is extended or adjusted under 35 U.S.C. 154(b) by 811 days.

(21) Appl. No.: 11/035,810

(22) Filed: Jan. 18, 2005

(65) Prior Publication Data
US 2005/0173406 A1 Aug. 11, 2005

(30) Foreign Application Priority Data

Jan. 18, 2004 (JP) ................................. 2004-042088
Nov. 22, 2004 (JP) ................................. 2004-337141

(51) Int. Cl.
| B23K 13/08 | (2006.01) |
| B60L 1/02 | (2006.01) |
| B62K 21/26 | (2006.01) |
| B62J 33/00 | (2006.01) |

(52) U.S. Cl.
CPC . B62K 21/26 (2013.01); B62J 33/00 (2013.01)

(58) Field of Classification Search
USPC ......... 219/204, 202, 506, 497, 505, 499, 501, 219/508, 256, 257, 227–229, 551.8, 557, 219/558.8; 74/551.1, 558.8, 557, 558.6
See application file for complete search history.

(56) References Cited

U.S. PATENT DOCUMENTS

| 1,546,413 | A | * | 7/1925 | Solomon ........................ 219/204 |
| 4,506,145 | A | * | 3/1985 | Kawamura et al. ........... 219/499 |
| 4,511,097 | A | * | 4/1985 | Tsuge et al. ................ 242/390.9 |
| 4,944,056 | A | * | 7/1990 | Schroeder et al. ................ 5/85.1 |
| 5,072,098 | A | * | 12/1991 | Matthews et al. .............. 219/501 |
| 5,128,661 | A | * | 7/1992 | Fowler ........................... 345/184 |
| 5,225,974 | A | * | 7/1993 | Mathews et al. ................. 700/11 |
| 5,708,244 | A | * | 1/1998 | Conti .......................... 200/61.85 |
| 5,718,120 | A | | 2/1998 | Sakurai |
| 5,757,165 | A | * | 5/1998 | Minks ............................ 322/33 |
| 5,861,610 | A | * | 1/1999 | Weiss ............................ 219/497 |
| 6,114,668 | A | * | 9/2000 | Ogata et al. .................... 219/494 |
| 6,392,316 | B1 | * | 5/2002 | Yoshioka et al. ................ 307/66 |
| 6,400,564 | B1 | * | 6/2002 | Nishimoto et al. ........... 361/683 |
| 2002/0005861 | A1 | * | 1/2002 | Lewis ........................... 345/691 |

(Continued)

FOREIGN PATENT DOCUMENTS

| EP | 1 371 544 | | 12/2003 |
| EP | 1371544 | * | 12/2003 |

(Continued)

OTHER PUBLICATIONS

Japanese Office Action dated Mar. 4, 2008, issued in corresponding Japanese Patent Application No. 2004-337141.

*Primary Examiner* — Sang Y Paik
(74) *Attorney, Agent, or Firm* — Westerman, Hattori, Daniels & Adrian, LLP

(57) ABSTRACT

A grip heater controlling apparatus controls an amount of current supplied from a power supply to a grip heater mounted on a handle grip on the steering handle of a motorcycle. The grip heater controlling apparatus has a single momentary switch operable by the driver of the motorcycle, and an amount-of-current controller for changing the amount of current cyclically to at least three levels, including 0, depending on the number of times that the momentary switch is operated.

15 Claims, 19 Drawing Sheets

(56) References Cited

U.S. PATENT DOCUMENTS

| | | |
|---|---|---|
| 2002/0158583 A1* | 10/2002 | Lys et al. .................... 315/82 |
| 2003/0019734 A1* | 1/2003 | Sato et al. .................. 200/317 |
| 2003/0121903 A1* | 7/2003 | Baker et al. ................ 219/485 |
| 2003/0226836 A1* | 12/2003 | Miura et al. ................ 219/204 |
| 2003/0231630 A1* | 12/2003 | Messenger .................. 370/392 |
| 2004/0007567 A1 | 1/2004 | Downey et al. |
| 2004/0021427 A1* | 2/2004 | Bruwer et al. .............. 315/2 A |
| 2004/0195916 A1* | 10/2004 | Katrak et al. .................. 307/4 |
| 2004/0263094 A1* | 12/2004 | Lister ......................... 315/291 |

FOREIGN PATENT DOCUMENTS

| | | | |
|---|---|---|---|
| GB | 2 287 230 | | 9/1995 |
| GB | 2287230 | * | 9/1995 |
| JP | 61-146671 A | | 7/1986 |
| JP | 62-064610 A | | 3/1987 |
| JP | 63-132290 A | | 6/1988 |
| JP | 03254798 A | * | 11/1991 |
| JP | 06-026661 A | | 2/1994 |
| JP | 10-79284 | * | 3/1998 |
| JP | 10-81284 | * | 3/1998 |
| JP | 11-089725 A | | 4/1999 |
| JP | 11-124077 A | | 5/1999 |
| JP | 3231247 | | 9/2001 |
| JP | 2002-096785 A | | 4/2002 |
| JP | 2004-009969 A | | 1/2004 |
| JP | 2004-067076 A | | 3/2004 |

* cited by examiner

FIG. 12

| Lv | $D_{L1}$ | $D_{L2}$ | $D_{L3}$ |
|---|---|---|---|
| 0 | 0 | 0 | 0 |
| 5 | 100 | 100 | 100 |
| 4 | 10 | 100 | 100 |
| 3 | 0 | 100 | 100 |
| 2 | 0 | 10 | 100 |
| 1 | 0 | 0 | 100 |

FIG. 18

| TURN ON/OFF | Lv | 0 | 5 | 4 | 3 | 2 | 1 |
|---|---|---|---|---|---|---|---|
| | LED1 | × | ○ | △ | × | × | × |
| | LED2 | × | ○ | ○ | ○ | △ | × |
| | LED3 | × | ○ | ○ | ○ | ○ | ○ |
| VOLTAGE WAVEFORM | LED1 | ---- | ──── | ⊓⊔ (T) | ---- | ---- | ---- |
| | LED2 | ---- | ──── | ──── | ──── | ⊓⊔ (T) | ---- |
| | LED3 | ---- | ──── | ──── | ──── | ──── | ---- |
| | HEATERS | ──── | ──── | ⊔⊓ (T) | ⊔⊓ (T) | ⊔⊓ (T) | ⊔⊓ (T) |
| HEATER CURRENT [%] | | 0 | 100 | 80 | 60 | 40 | 20 |

APPARATUS FOR AND METHOD OF CONTROLLING GRIP HEATER

BACKGROUND OF THE INVENTION

1. Field of the Invention

The present invention relates to an apparatus for and a method of controlling the amount of current in a grip heater mounted in a tubular steering handle of a vehicle such as a two-wheeled cycle, a snow mobile, a personal watercraft, a three-wheeled buggy, or the like, or the tubular steering handle of an outboard motor or the like.

2. Description of the Related Art

Some vehicles such as two-wheeled cycles (motorcycles, bicycles, motor-assisted bicycles, etc.), snow mobiles, personal watercrafts, three-wheeled buggies, or the like have steering handles with left and right handle grips incorporating nichrome-wire or copper-foil heaters. There have been developed grip heater controlling apparatus for supplying a current from a power supply to those heaters to make the handle grips warm for allowing the driver to drive the vehicle comfortably in winter or cold climate.

Since the amount of heat generated by the heaters should preferably be adjustable depending on the atmospheric temperature and the driver, there has been proposed a grip heater controlling apparatus having a rotary potentiometer (or rheostat) for adjusting the amount of current supplied to the heaters (see, for example, Japanese Patent No. 3,231,247). The proposed grip heater controlling apparatus allows the driver to operate the potentiometer to adjust the amount of heat generated by the heaters as desired. If the potentiometer is positioned near either one of the grip heaters, then the driver finds it easy to operate the potentiometer.

Certain motorcycles or the like have handle covers which cover the handle grips as well as a brake lever and a clutch lever for the purpose of preventing air heated by the heaters from escaping as well as protecting the driver's hands from the wind.

However, if such a handle cover is provided on the handle, the handle cover covers the handle grip combined with the above potentiometer. Since the handle cover covers the potentiometer, the driver finds it difficult to operate potentiometer.

Furthermore, since the potentiometer is of the rotary type, it needs to be operated by two fingers, e.g., a thumb and an index finger, of the driver.

SUMMARY OF THE INVENTION

It is an object of the present invention to provide an apparatus for and a method of easily controlling the amount of current supplied from a power supply to a grip heater.

According to the present invention, there is provided an apparatus for controlling an amount of current supplied from a power supply to a grip heater mounted on a steering handle of a vehicle, comprising a single momentary switch operable by the driver of the vehicle, and an amount-of-current controller for changing the amount of current cyclically to at least three levels depending on the number of times that the momentary switch is operated.

According to the present invention, there is also provided a method of controlling an amount of current supplied from a power supply to a grip heater mounted on a steering handle of a vehicle, comprising the steps of using a single momentary switch operable by the driver of the vehicle, and changing the amount of current cyclically to at least three levels depending on the number of times that the momentary switch is operated.

As describe above, depending on the number of times that the momentary switch is operated, the amount of current is changed cyclically to at least three levels, so that the amount of current supplied from the power supply to the grip heater can easily be controlled. One of the levels of the amount of current may include an off state in which the amount of current is 0.

In an initial state when a power supply switch of the vehicle is turned on, the amount-of-current controller may minimize the amount of current, and when the momentary switch is operated once in the initial state, the amount-of-current controller may maximize the amount of current. Therefore, in the initial state when the power supply switch is turned on, the grip heater does not start being energized against the will of the driver of the vehicle. When the momentary switch is operated once in the initial state, the amount of current is maximized, so that the handle grip is quickly heated through a simple action.

If the apparatus has an indicator controlled by the amount-of-current controller, for indicating the amount of current, then the driver can easily confirm the amount of current.

The vehicle may have a speedometer and a handle grip, and the apparatus may further comprise a unit disposed between the speedometer and the handle grip, the momentary switch and the indicator being mounted on the unit, the momentary switch being positioned more closely to the handle grip than the indicator. The driver finds it easy to reach the momentary switch with a finger, without covering the indicator. As the indicator is positioned closer to the speedometer, its visibility is increased.

The indicator may comprise fewer light-emitting elements than the levels, and the levels may be indicated when the light-emitting elements are turned off, fully turned on, and turned on at an intermediate luminance level. The number of light-emitting elements is thus suppressed, making the unit inexpensive to manufacture and small in size, and allowing the indicator to consume reduced electric power.

The indicator may comprise an array of the light-emitting elements, and the light-emitting elements may be successively turned on at the intermediate luminance level or fully turned on from an end of the array depending on the levels. The driver can intuitively grasp any one of the levels based on the number of successively arrayed light-emitting elements that are turned on at the intermediate luminance level or fully turned on.

If the light-emitting elements comprise three light-emitting elements, then the indicator can indicate seven levels based on the light-emitting elements that are turned on at the intermediate luminance level or fully turned on, allowing practically sufficient levels to be displayed for identification.

The light-emitting elements may be adjusted in luminance under PWM control, and turned on at the intermediate luminance level at a duty ratio ranging from 5 to 20%. With this arrangement, the light-emitting elements that are turned on at the intermediate luminance level can easily be recognized.

The amount-of-current controller may have a voltage monitor for detecting a power supply voltage of the power supply, and the amount-of-current controller may set the amount of current to 0 when the power supply voltage as detected by the voltage monitor is equal to or less than a first threshold.

The amount-of-current controller may automatically resume energization of the grip heater based on the levels when the power supply voltage returns to a second threshold larger than the first threshold.

The apparatus may further comprise an indicator controlled by the amount-of-current controller, and the amountof-current controller may continuously turn on or off the indicator to indicate the amount of current when the power supply voltage exceeds a second threshold larger than the first threshold, and flicker at least a portion of the indicator when the power supply voltage is equal to or less than the first threshold. With this arrangement, the driver can easily recognize when the grip heater is de-energized due to a drop in the power supply voltage. The indicator can be used to indicate both the amount of current and a drop in the power supply voltage.

The apparatus may further comprise an indicator controlled by the amount-of-current controller, and the amount-of-current controller may change the amount of current and continuously turn on or off the indicator to indicate the amount of current when the on-time of the momentary switch in a single turn-on cycle is less than a predetermined time, and flicker at least a portion of the indicator when the on-time of the momentary switch in a single turn-on cycle is equal to or longer than the predetermined time. With this arrangement, the driver can easily recognize a malfunction of the switch. The indicator can be used to indicate both the amount of current and a malfunction of the switch.

If the levels comprise a range from three to seven levels, then the amount of current can be adjusted, and operation of the switch is not complicated and time-consuming.

Since the power supply voltage may be unstable within a predetermined time after the power supply switch is turned on, the amount-of-current controller may perform a masking process to make any operation of the momentary switch invalid within such a predetermined time.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 12 is a table showing the relationship between amount-of-current level parameter values and duty ratio values;

FIG. 18 is a table showing the relationship between amount-of-current level parameter values, indicator turn-on states, and amounts of current supplied to the heater.

DESCRIPTION OF THE PREFERRED EMBODIMENT

An apparatus for and a method of controlling the amount of current in a grip heater according to an embodiment of the present invention will be described below with reference to FIGS. 1 through 19. In the description which follows, the terms "left" and "right" or similar terms are referred to as directions as seen from the driver seated on a seat 32 (see FIG. 1), the term "forward" or similar terms are referred to as a direction in which a motorcycle 12 (see FIG. 1) moves forwardly, and the term "rearward" or similar terms are referred to as a direction in which the motorcycle 12 moves rearwardly.

Figure 1:
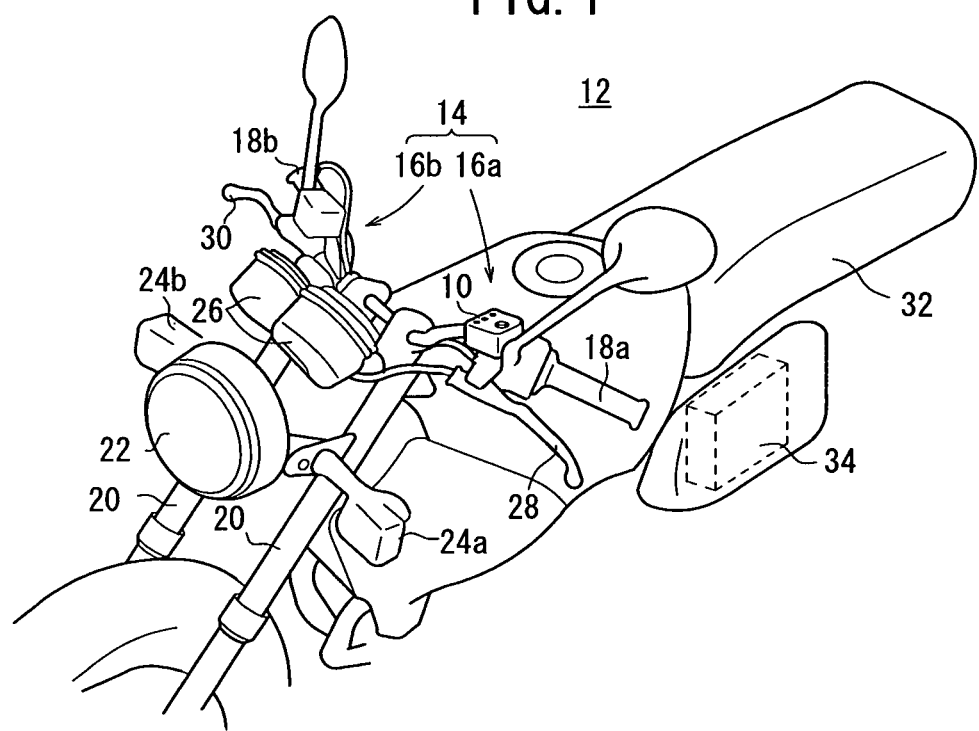
FIG. 1 is a fragmentary perspective view of a motorcycle incorporating a grip heater controlling apparatus according to an embodiment of the present invention.

As shown in FIG. 1, a grip heater controlling apparatus 10 according to an embodiment of the present invention is mounted on a steering handle 14 of a motorcycle (vehicle) 12 near a left handlebar 16a thereof. The grip heater controlling apparatus 10 serves to control the amount of current supplied to a grip heater 52 (see FIG. 3) which is mounted in each of a handle grip 18a on the left handlebar 16a and a handle grip 18b on a right handlebar 16b.

The motorcycle 12 has a front fork 20 supporting a front wheel and angularly movably supported on a motorcycle frame, and a head lamp 22 and winker or direction indicator lamps 24a, 24b which are mounted on an upper portion of the front fork 20. The winker lamps 24a, 24b are provided on both sides of the front fork 20, respectively. The steering handle 14 with instruments 26 such as a speedometer, etc. mounted thereon is supported on the upper end of the front fork 20. A clutch lever 28 is mounted on the left handlebar 16a, and a brake lever 30 is mounted on the right handlebar 16b. The motorcycle 12 also has a seat 32 for the driver to be seated thereon and a 12-V battery (power supply) 34 disposed below the seat 32. The battery 34 is a lead battery. A terminal voltage of the battery 34 is set to be slightly higher than 12.0 V in view of wire resistance or the like.

Figure 2:
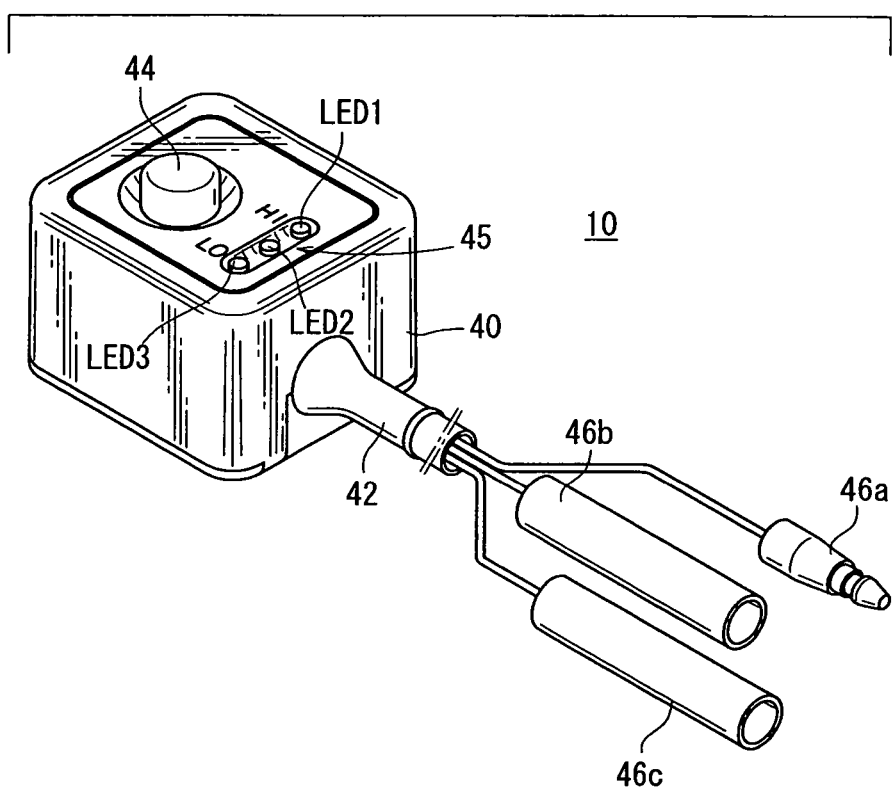
FIG. 2 is a perspective view of the grip heater controlling apparatus according to the embodiment.

As shown in FIG. 2, the grip heater controlling apparatus 10 is in the form of a single unit and comprises a box-shaped housing 40 of synthetic resin and a cable 42 extending from a side panel of the housing 40. The housing 40 is mounted on the left handlebar 16a by screws inserted through screw holes defined in a lower panel of the housing 40. The housing 40 supports on its upper panel a momentary switch 44 positioned in a left region thereof and an indicator 45 positioned in a right region thereof and having three light-emitting diodes LED1, LED2, LED3. The switch 44 and the light-emitting diodes LED1, LED2, LED3 are actually mounted on a board disposed in the housing 40. The switch 44 has a water-resistant rubber sheet disposed as a switch operating member on the upper panel of the housing 40, and the light-emitting diodes LED1, LED2, LED3 have respective light guides disposed on the upper panel of the housing 40. Though the switch 44 is illustrated as having the switch operating member which projects upwardly, the switch 44 may comprise any of various other switches such as a switch whose internal switch mechanism is operable through a planar sheet, or a membrane switch.

The three light-emitting diodes LED1, LED2, LED3 are arrayed in line on the upper panel of the housing 40. The upper panel of the housing 40 is printed with letters "HI", which stands for "HIGH", adjacent to the light-emitting diode LED1, and letters "LO", which stands for "LOW", adjacent to the light-emitting diode LED3.

The cable 42 has its distal end branched into three harness wires having a power supply terminal 46a, a ground terminal 46b, and a heater terminal 46c, respectively.

As described above, since the grip heater controlling apparatus 10 is mounted on the left handlebar 16a and the switch 44 is positioned in the left region of the upper panel of the housing 40, the driver seated on the seat 32 can easily operate the switch 44. Basically, the driver can operate the switch 44 with one finger simply by pressing the switch 44, rather than holding or turning the switch 44 with two fingers for operating a potentiometer or the like.

When the driver operates the switch 44, the left hand of the driver does not cover the light-emitting diodes LED1, LED2, LED3 of the indicator 45, and the driver can easily confirm the state of the light-emitting diodes LED1, LED2, LED3. Because the light-emitting diodes LED1, LED2, LED3 are positioned in the right region of the upper panel of the housing 40, they are close to the instruments 26. The housing 40 is disposed closely to the right end of the left handle grip 18a, and the cable 42 extends from the right side panel of the housing 40. The cable 42 does not interfere with the left handle grip 18a. Furthermore, the grip heater controlling apparatus 10 can easily be operated as it has not other manually manipulated elements than the switch 44. Details of how the grip heater controlling apparatus 10 is operated will be described later on.

Figure 3:
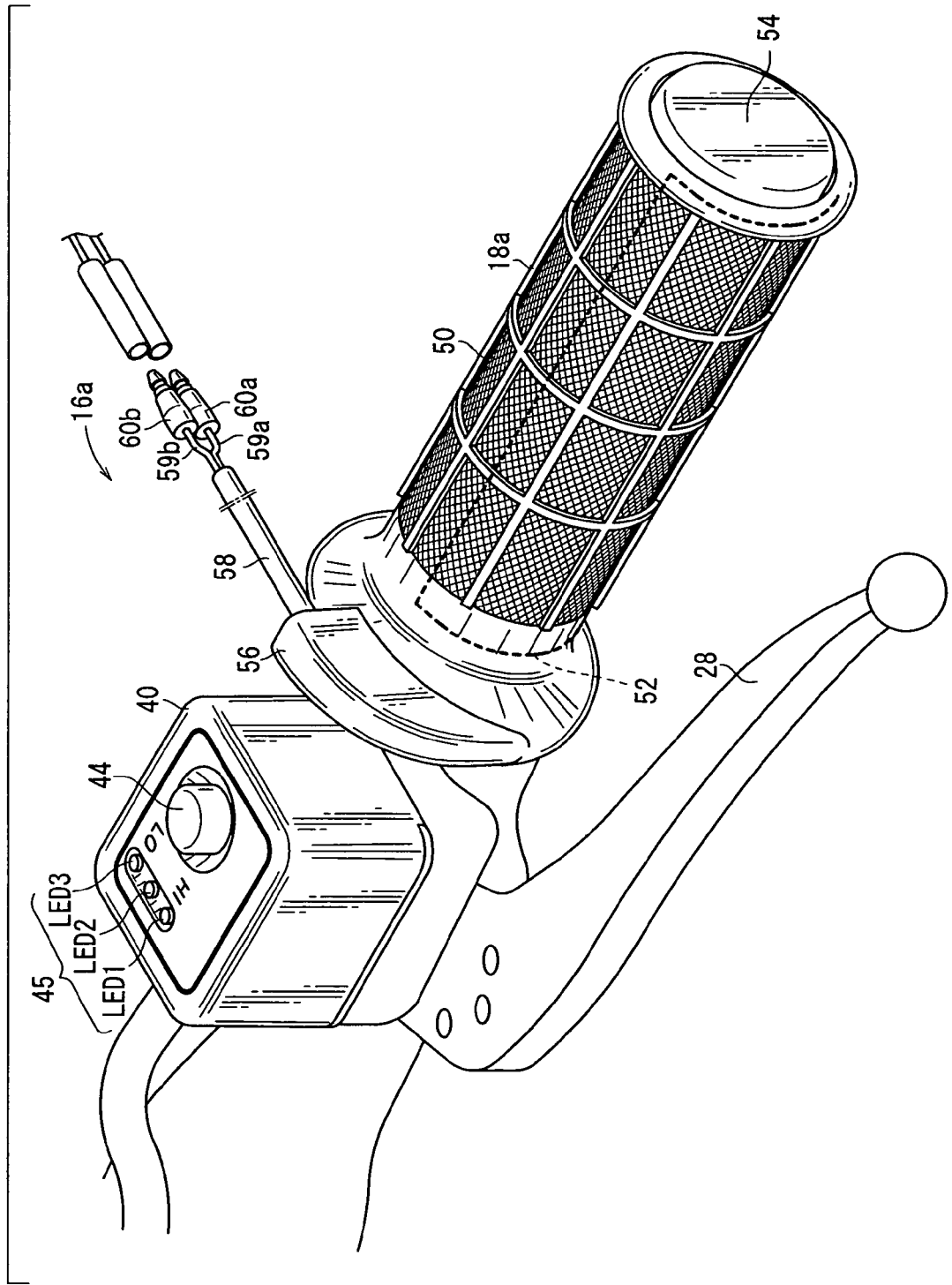
FIG. 3 is a perspective view of the grip heater controlling apparatus which is mounted on the steering handle of the motorcycle near a left handlebar thereof.

As shown in FIG. 3, the handle grip 18a on the left handlebar 16a has a cylindrical grip tube 50, a grip heater 52 disposed in the grip tube 50, an end cap 54 mounted on an end of the grip tube 50, a cable cover 56 mounted on an upper portion of the other end of the grip tube 50, and a cable 58 extending rearwardly from the cable cover 56. The cable cover 56 is of such a shape that it projects progressively radially outwardly from a forward side toward an upper side of the other end of the grip tube 50. The cable 58 extends from an end of the cable cover 56.

The end of the cable 58 which extends from the cable cover 56 is divided into two harness wires 59a, 59b having respective terminals 60a, 60b. The harness wires 59a, 59b have respective ends electrically connected to a heater element 62 of the grip heater 52 in the grip tube 50.

Figure 4:
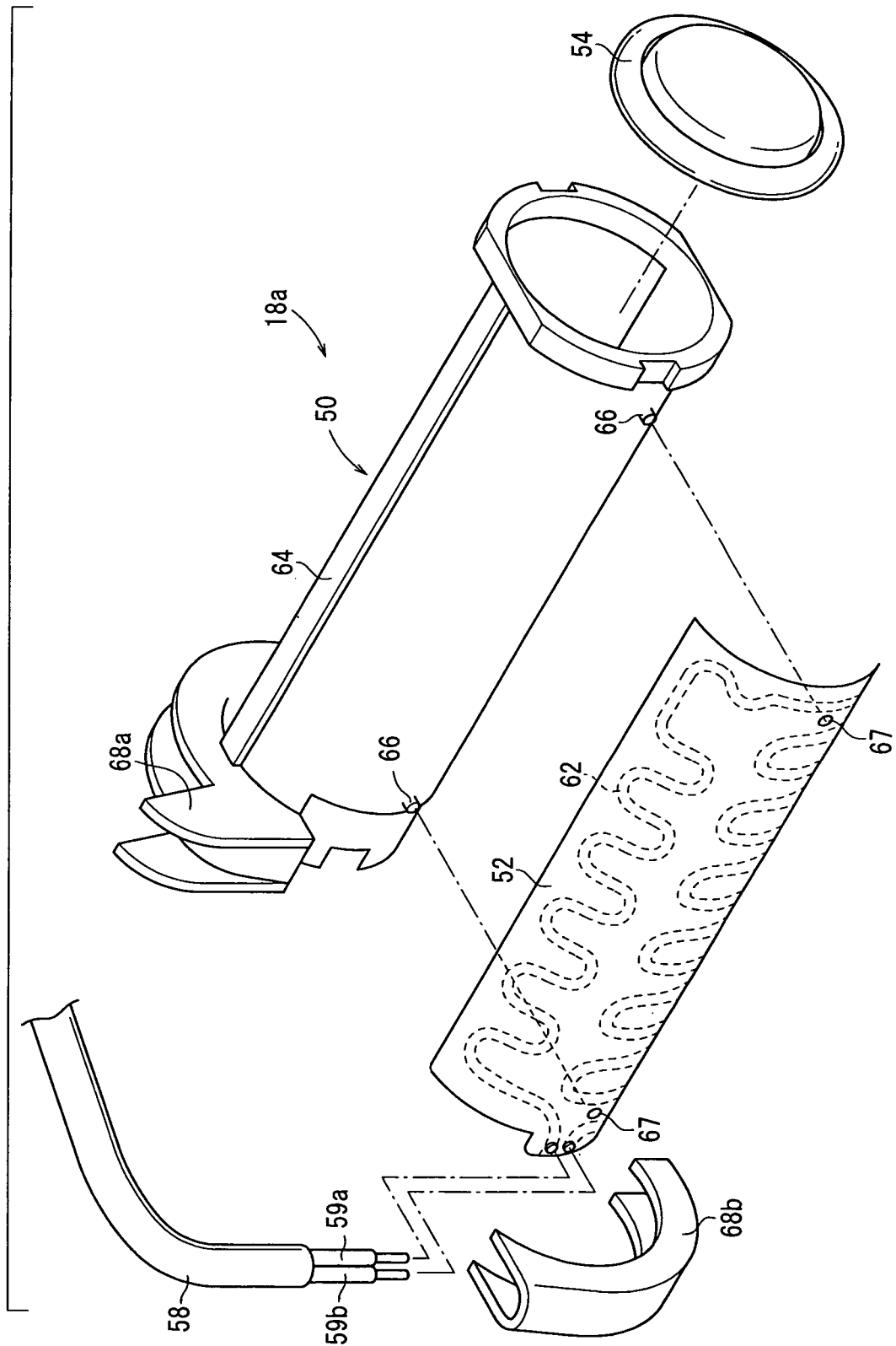
FIG. 4 is an exploded perspective view of the handle grip combined with a heater before a rubber grip layer is mounted.

As shown in FIG. 4, a core 64 is disposed in the grip tube 50 and has anchors 66 disposed on front sides of the opposite ends of the core 64. The grip heater 52 has holes 67 defined in opposite ends thereof. The anchors 66 of the core 64 are fitted respectively in the holes 67, thereby positioning the grip heater 52 with respect to the core 64. The end cap 54 is mounted on an outer end of the core 64, and two guides 68a, 68b of synthetic resin are mounted on the other inner end of the core 64. The guides 68a, 68b serve as an inner base of the cable cover 56 (see FIG. 3), and also serve to protect and guide the cable 58. In FIG. 4, a rubber grip layer on the handle grip 18a is omitted from illustration. Actually, after the core 64, the grip heater 52, the end cap 54, the guides 68a, 68b, and the cable 58 are assembled on the grip tube 50, a rubber grip layer is formed on the assembly, producing the handle grip 18a.

The grip heater 52 is in the form of a horizontally elongate film assembly comprising the heater element 62 sandwiched between two PET (PolyEthylene Terephthalate resin) films. The grip heater 52 is wound on and fixed to a front area of the core 64. Though the grip heater 52 covers only the front area of the core 64, it can heat fingertips of the left hand of the driver because the fingertips are placed on the front area of the handle grip 18a when the driver grips the handle grip 18a. The fingertips are sensitive to low temperatures and tend to be cooled by the wind when they are placed on the front area of the handle grip 18a. However, the fingertips are heated by the grip heater 52 that is placed on the front area of the core 64.

The heater element 62 comprises a single slender stainless steel foil, and is disposed in a meandering pattern without crossings and overlaps on a substantially front area of the grip heater 52. The heater element 62 has opposite ends disposed near the cable cover 56 and electrically connected to the ends of the harness wires 59a, 59b.

The handle grip 18b is of a structure basically identical to the handle grip 18a, and has a grip heater 52 disposed in a front area thereof for heating fingertips of the right hand of the driver.

The handle grips 18a, 18b have their orientations adjustable with respect to the left and right handlebars 16a, 16b.

As shown in FIG. 3, the cable cover 56 is disposed on the upper portion of the handle grip 18a on the left handlebar 16a. This layout is preferable because the handle grip 18a is not rotated for accelerator control.

Figure 5:
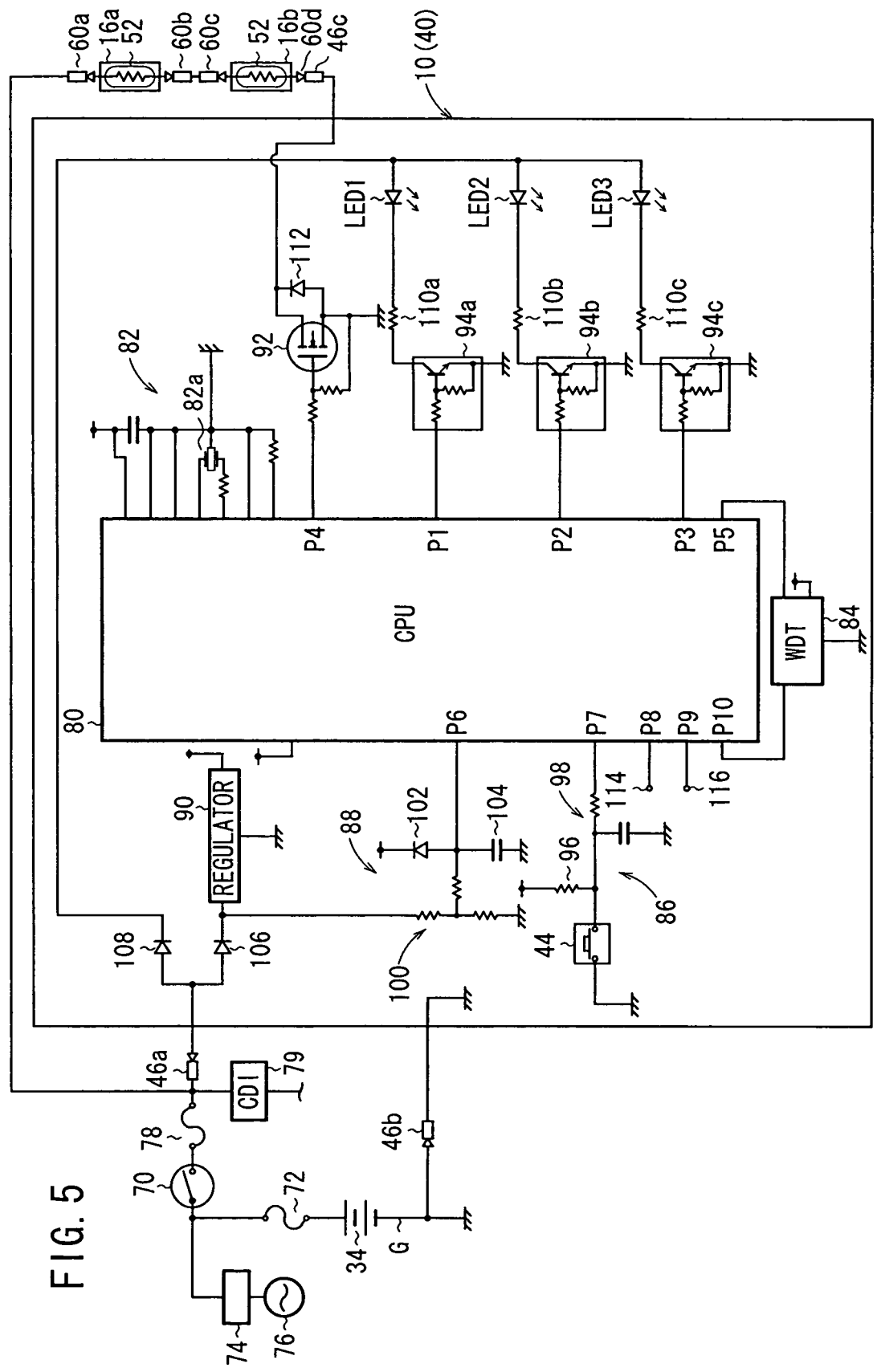
FIG. 5 is a functional block diagram of the grip heater controlling apparatus and connections thereof.

As shown in FIG. 5, an ignition switch (power supply switch) 70 of the motorcycle 12 has an input terminal connected through a main fuse 72 to the positive terminal of a battery 34 and also connected through a rectifying circuit 74 to an alternator (power supply) 76. The alternator 76 is rotated by the unillustrated engine of the motorcycle 12 to generate AC power, which is rectified by the rectifying circuit 74 into DC power that is supplied to the ignition switch 70 and to the battery 34, thus charging the battery 34.

The battery 34 has a negative terminal connected through a ground line G to the ground terminal 46b. The motorcycle frame may serve as part of the ground line G.

The ignition switch 70 has an output terminal connected through an auxiliary fuse 78 to the power supply terminal 46a and also to the terminal 60a of the harness wire 59a on the left handlebar 16a. The terminal 60b of the harness wire 59b on the left handlebar 16a is connected to a terminal 60c of a harness wire on the right handlebar 16b, which is connected to one terminal of the grip heater 52 on the right handlebar 16b. Therefore, the grip heater 52 on the left handlebar 16a is connected in series to the grip heater 52 on the right handlebar 16b. A terminal 60d of a harness wire on the right handlebar 16b, which is connected to the other terminal of the grip heater 52 on the right handlebar 16b, is connected to the heater terminal 46c.

If the ignition switch 70 has a plurality of output contact points, it is preferable that the power supply terminal 46a is connected to an output contact point for an ignition circuit, which is connected to a spark plug via, for example, a CDI (Capacitive Discharge Ignition) 79 (or an ignition coil or the like).

As shown in FIG. 5, after the ignition switch 70 is turned on and until the engine is started, the grip heater controlling apparatus 10 is supplied with electric power at a power supply voltage V0 from the battery 34. After the engine is started, the grip heater controlling apparatus 10 is supplied with electric power at the power supply voltage V0 from the battery 34 and the alternator 76. The power supply voltage V0 varies depending on the charged state of the battery 34 and the operating state of the alternator 76.

The housing 40 of the grip heater controlling apparatus 10 houses therein a CPU (Central Processing Unit, amount-of-current controller) 80 as a main controller, an oscillating circuit 82 having a quartz oscillator 82a for supplying a control clock signal to the CPU 80, a WDT (Watch Dog Timer) 84 for monitoring operation of the CPU 80, an input interface 86 of the switch 44, a power supply voltage monitoring circuit 88 for checking the power supply voltage V0, and a regulator 90 for generating IC power to be supplied to the integrated circuit of the CPU 80. The CPU 80 may comprise a one-chip microcomputer.

The housing 40 also houses therein an NPN-type field-effect transistor 92 serving as a current output component for supplying a current to the grip heaters 52, and transistors 94a, 94b, 94c for energizing the light-emitting diodes LED1, LED2, LED3.

The WDT 84 monitors pulses that are periodically output from an output port P5 of the CPU 80. If the CPU 80 suffers a failure and is unable to generate pulses for a predetermined period of time, then the WDT 84 supplies a predetermined signal to a reset port P10 of the CPU 80, resetting the CPU 80.

The input interface 86 comprises a pull-up resistor 96 inserted between one terminal of the switch 44 and the regulator 90, and a filter 98 for stabilizing a signal from the switch 44. The input interface 86 is connected to an input port P7 of the CPU 80.

The power supply voltage monitoring circuit 88 has a voltage-dividing resistor circuit 100 for dividing the power supply voltage V0, a protective diode 102 for preventing a voltage greater than the IC power from being applied, and a filter 104 for stabilizing a signal to be applied to the CPU 80. The power supply voltage monitoring circuit 88 is connected to an analog input terminal P6 of the CPU 80. The voltage-dividing resistor circuit 100 divides the power supply voltage V0 that has passed through a protective diode 106 to generate a one-fifth voltage Vb, which is determined by the following equation (1):

$$Vb=(V0-0.64)/5 \quad (1)$$

where the numerical value 0.64 represents a voltage drop caused by the protective diode 106. For example, if the power supply voltage V0 is 12.8 V, the voltage-dividing resistor circuit 100 produces the voltage Vb represented by (12.8−0.64)/5=2.43 V, and if the power supply voltage V0 is 12.0 V, the voltage-dividing resistor circuit 100 produces the voltage Vb represented by (12.0−0.64)/5=2.27 V.

The regulator 90 converts the voltage that is supplied via the power supply terminal 46a into the IC power of 5 V. The regulator 90 is protected by the protective diode 106.

The light-emitting diodes LED1, LED2, LED3 have respective anodes connected through a protective diode 108 to the power supply terminal 46a, and respective cathodes connected through respective current-limiting resistors 110a, 110b, 110c to the collector terminals of respective transistors 94a, 94b, 94c. The transistors 94a, 94b, 94c have respective emitter terminals connected to ground, so that the transistors 94a, 94b, 94c are emitter-grounded. The transistors 94a, 94b, 94c have respective base terminals connected respectively to output ports P1, P2, P3 of the CPU 80. Therefore, the light-emitting diodes LED1, LED2, LED3 can be energized and de-energized when the output ports P1, P2, P3 are turned on and off. Furthermore, the luminance of light emitted from the light-emitting diodes LED1, LED2, LED3 can be controlled when the periods of time for which the output ports P1, P2, P3 are turned on and off are controlled in small time intervals.

The field-effect transistor 92 has a drain terminal connected through the heater terminal 46c to the grip heaters 52, a source terminal connected to ground and also connected through a protective diode 112 to the drain terminal thereof, and a gate terminal connected to an output port P4 of the CPU 80. Therefore, the grip heaters 52 can be turned on and off when the output port P4 is turned on and off. The amount of current supplied to the grip heaters 52 can continuously be controlled when the periods of time for which the output port P4 is turned on and off are controlled in small time intervals.

The CPU 80 has input/output ports P8, P9 are connected to respective pins 114, 116 on the board. If a certain communication unit is connected to the pins 114, 116, the communication unit can communicate with the CPU 80. If the CPU 80 is set to a certain communication mode while it is being connected to the communication unit, a program can be loaded from the communication unit into a nonvolatile recording unit such as a flash memory or the like in the CPU 80. The CPU 80 can then read and execute the program. It is also possible to write a program into the nonvolatile recording unit in the CPU 80 before it is mounted on the board.

A control process of controlling the amount of current supplied to the grip heaters 52 mounted on the handle grips 18a, 18b with the grip heater controlling apparatus 10 will be described below with reference to FIGS. 6 through 19.

FIGS. 6, 7, 8, 9, 10, 11, 15, and 16 show processing sequences to be carried out by the CPU 80 based on the program stored in the nonvolatile recording unit. Unless otherwise noted, the processing sequences are executed in the order of step numbers.

When the driver inserts the key into the ignition switch 70 and turns the key, the grip heater controlling apparatus 10 is supplied with electric power from the battery 34, and the CPU 80 starts operating. The CPU 80 reads the program from the nonvolatile recording unit and executes the program successively from a starting address, thereby executing a main routine shown in FIG. 6 and a timer routine shown in FIGS. 15 and 16 parallel to each other.

The main routine is cyclically executed at a period of 10 msec. based on a main period monitoring flag Fmain that is set in the timer routine, and the timer routine is executed cyclically at a period of 100 μsec. FIGS. 7 through 11 show subroutines that are called from the main routine.

The main routine and the subroutines that are called from the main routine will first be described below, and then the timer routine will be described later on.

Figure 6:
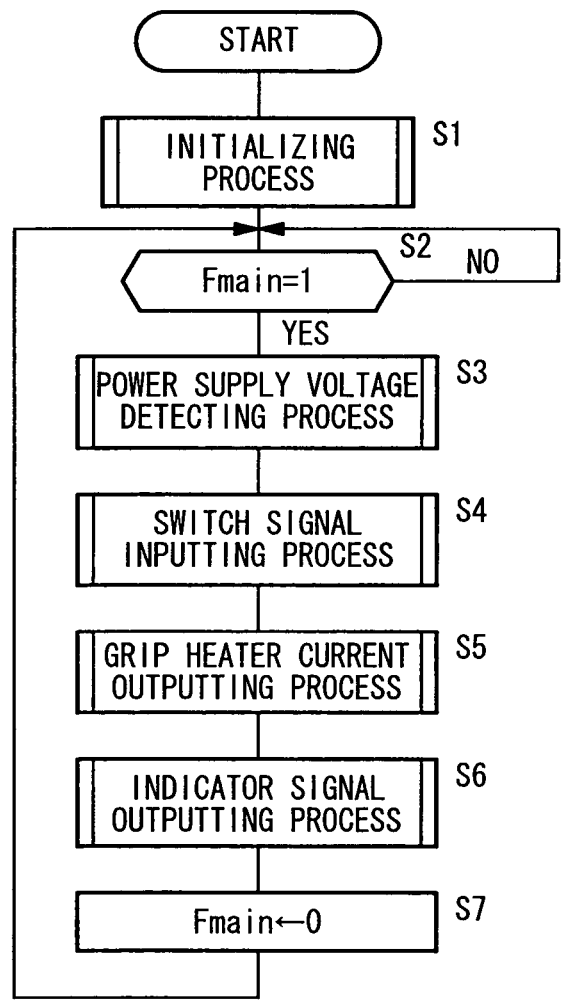
FIG. 6 is a flowchart of a main routine of operation of the grip heater controlling apparatus.

In the main routine, the subroutine of an initializing process (see FIG. 7) is executed in step S1 shown in FIG. 6.

In step S2, the value of the main period monitoring flag Fmain is checked. If Fmain=1, then control goes to step S3. If Fmain=0, then control waits until Fmain=1. The main period monitoring flag Fmain is controlled by the timer routine such that it is set to "1" every 10 msec.

In step S3 (voltage monitor), the subroutine of a power supply voltage detecting process (see FIG. 8) is executed.

In step S4, the subroutine of a switch signal inputting process (see FIG. 9) is executed.

In step S5, the subroutine of a grip heater current outputting process (see FIG. 10) is executed.

In step S6, the subroutine of an indicator signal outputting process (see FIG. 11) is executed.

In step S7, the main period monitoring flag Fmain is reset to 0 (Fmain←0). Then, control goes back to step S2.

As described above, in the main routine, after the ignition switch 70 is turned on, the initializing process in step S1 is executed, and then the subroutines in steps S3 through S6 are executed every 10 msec. while referring to the value of the main period monitoring flag Fmain.

The subroutine of the initializing process in step S1 shown in FIG. 6 will be described below with reference to FIG. 7.

Figure 7:
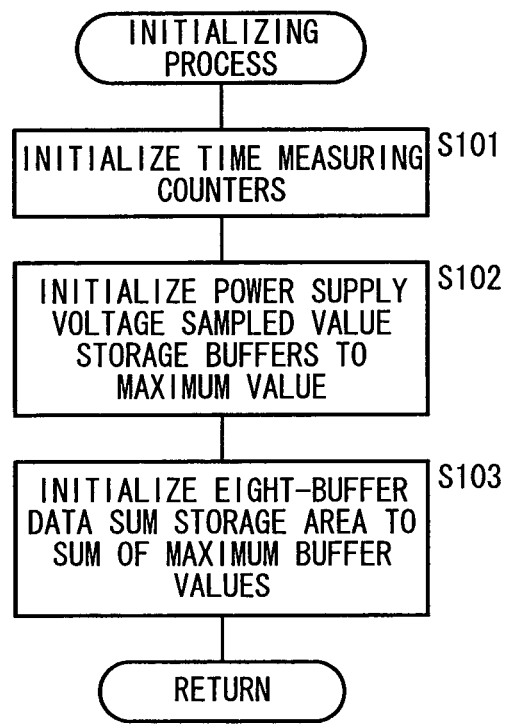
FIG. 7 is a flowchart of an initializing process in the main routine.

As shown in FIG. 7, various counters for measuring time are initialized in step S101. Specifically, a main period counter Cmain for main routine control, a time counter Con for indicating an on-state duration, a period counter Cpwm for heater control, a period counter CL for LED control, and a counter Cmsk for confirming a masking time, etc. are initialized.

In step S102, eight buffers for storing sampled values of the power supply voltage are initialized to respective maximum values.

In step S103, a storage area for storing the sum of data from the eight buffers is initialized to the sum of the maximum values stored in the respective buffers.

According to the processing in steps S102, S103, the buffers for storing sampled values of the power supply voltage and the storage area for storing the sum of data from those buffers are initialized to the maximum values (FFH if they are 8-bit data). When the ignition switch 70 is turned on, since the sampled values and the sum thereof are maximum, the power supply voltage V0 is not judged as dropping at an initial stage in the subsequent power supply voltage detecting process (step S3 in FIG. 6).

After step S103, the subroutine of the initializing process is put to an end, and control goes back to the main routine.

The subroutine of the power supply voltage detecting process in step S3 (FIG. 6) will be described below with reference to FIG. 8.

Figure 8:
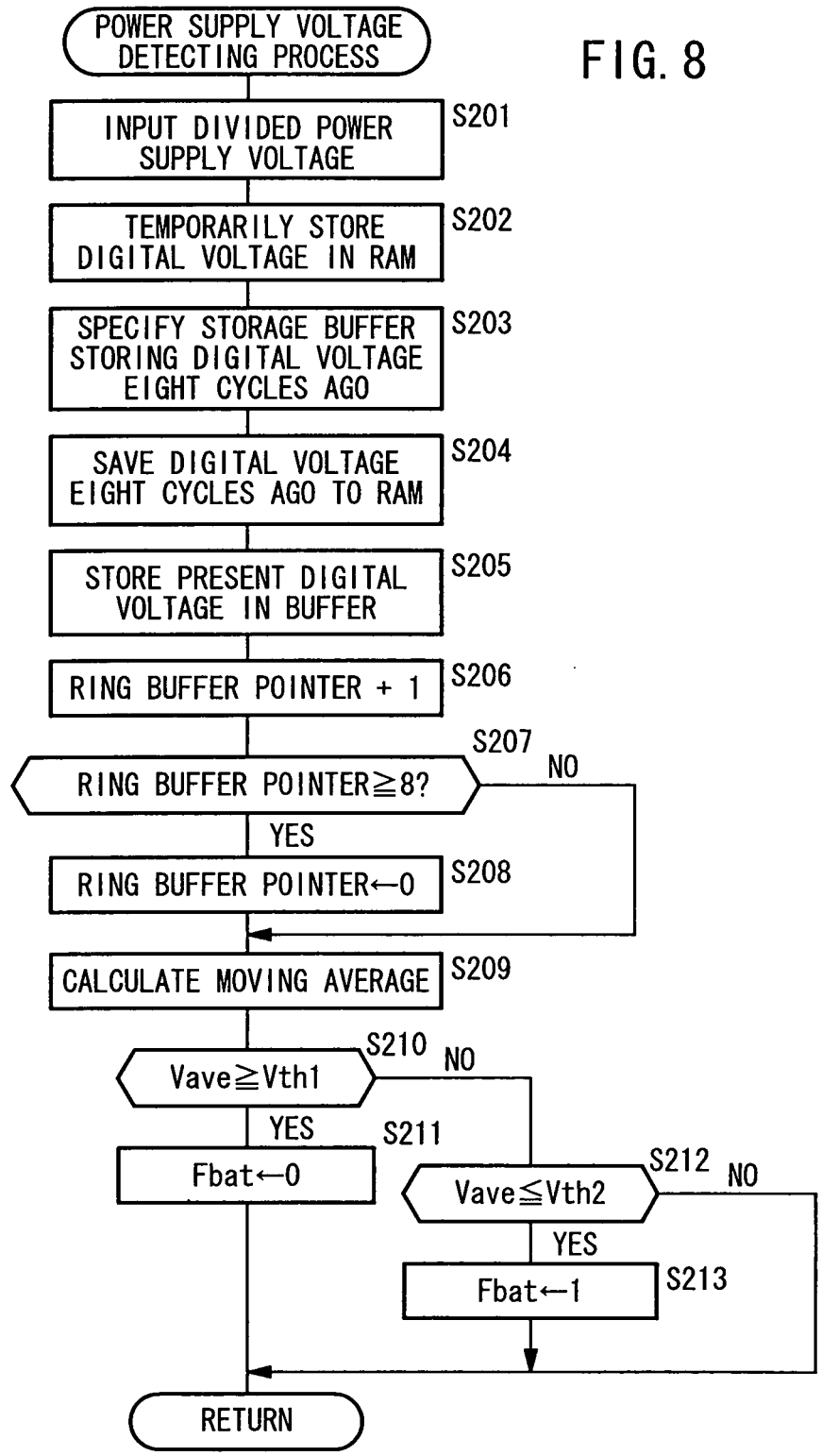
FIG. 8 is a flowchart of a power supply voltage detecting process in the main routine.

As shown in FIG. 8, the power supply voltage V0 is divided and input in step S201. Specifically, a voltage divided from the power supply voltage V0 by the voltage-dividing resistor circuit 100 is applied to the analog input port P6 of the CPU 80, which converts the divided voltage into a digital value and reads the digital voltage.

In step S202, the read digital voltage is temporarily stored in a predetermined address of RAM (Random Access Memory).

In step S203, a storage buffer which has stored the digital voltage converted eight cycles ago is specified by a ring buffer pointer Bp.

In step S204, the value stored in the storage buffer specified in step S203, i.e., the digital voltage converted eight cycles ago, is saved to a saving address of RAM.

In step S205, the digital voltage stored in the RAM in step S202 is stored into the storage buffer specified in step S203.

In step S206, the ring buffer pointer Bp is incremented to Bp←Bp+1.

In step S207, it is determined whether or not the ring buffer pointer Bp is 8 or greater. If Bp≥8, then control goes to step S208. If Bp<8, then control goes to step S209.

In step S208, the ring buffer pointer Bp is reset to Bp 0. Therefore, the ring buffer pointer Bp takes a value in the range from 0 to 7 through the processing in steps S206 through S208. Instead of steps S207, S208, the fourth and higher bits of the ring buffer pointer Bp may be masked, and the third and lower bits thereof may be used as valid bits to allow the ring buffer pointer Bp to take a value in the range from 0 to 7.

In step S209, a moving average value Vave of the digital voltages is calculated. Specifically, the digital voltage saved to the saving RAM in step S204, i.e., the digital voltage converted eight cycles ago, is subtracted from the value stored in the storage area for storing the sum of data from the buffers, and the digital voltage stored in the storage buffer in step S205, i.e., the preset digital voltage, is added to the value stored in the storage area. In this manner, the moving average value Vave of the digital voltages can be determined highly accurately through a simple process free of divisions without bit canceling.

The moving average value Vave is eight times greater than the voltage divided from the power supply voltage V0. However, the moving average value Vave can be used as a substantial average value to determine the value of the power supply voltage V0 because it is of a smoothed value determined with respect to the power supply voltage V0.

In step S210, it is determined whether or not the moving average value Vave is equal to or higher than a threshold Vth1 (second threshold) which corresponds to 12.8 V. If Vave≥Vth1, i.e., if V0≥12.8, then control goes to step S211. If Vave<Vth1, i.e., if V0<12.8, then control goes to step S212.

In step S211, a voltage judging flag Fbat is reset to Fbat←0, indicating that the power supply voltage V0 is normal. Then, the subroutine of the power supply voltage detecting process in the present cycle is put to an end.

In step S212, it is determined whether or not the moving average value Vave is equal to or lower than a threshold Vth2 (first threshold, Vth2<Vth1) which corresponds to 12.0 V. If Vave≤Vth2, i.e., if V0≤12.0, then control goes to step S213. In step S213, the voltage judging flag Fbat is set to Fbat←1, indicating that the power supply voltage V0 is lowered. After step S213, the subroutine of the power supply voltage detecting process in the present cycle is put to an end.

If Vave<Vth1, i.e., if V0>12.0, in step S212, then, the subroutine of the power supply voltage detecting process in the present cycle is put to an end.

According to the processing in steps S210 through S213, when the power supply voltage V0 drops below 12.0 V, the voltage judging flag Fbat is set to Fbat←1. The voltage judging flag Fbat is kept as Fbat=1 until the power supply voltage V0 subsequently becomes 12.8 V or higher. Therefore, the voltage judging flag Fbat changes with hysteretic characteristics. In other words, the CPU 80 continuously turns on or off the indicator 45 to indicate the amount of current when the power supply voltage V0 exceeds the threshold Vth1, and flickers at least a portion of the indicator 45 when the power supply voltage V0 is equal to or less than the threshold Vth2. Also, the CPU 80 actuates the indicator 45 to indicate a state based on the hysteretic characteristics when the power supply voltage V0 exceeds the threshold Vth2 and is equal to or less than the threshold Vth1. With this arrangement, the driver can easily recognize when the grip heater 52 is de-energized due to a drop in the power supply voltage V0. The indicator 45 can be used to indicate both the amount of current and a drop in the power supply voltage V0. Further, due to the hysteretic performance, the voltage judging flag Fbat does not change too frequently, but operates stably.

The moving average value Vave corresponds to the storage area for storing the sum of data in step S103, and is initialized to its maximum value in the initializing process. Consequently, the answer to step S210 is affirmative when the subroutine of the power supply voltage detecting process is executed for the first time. If the power supply voltage V0 is of a normal value, then the voltage judging flag Fbat is not set to Fbat←1 in the initializing process.

The subroutine of the switch signal inputting process in step S4 (see FIG. 6) will be described below with reference to FIG. 9.

Figure 9:
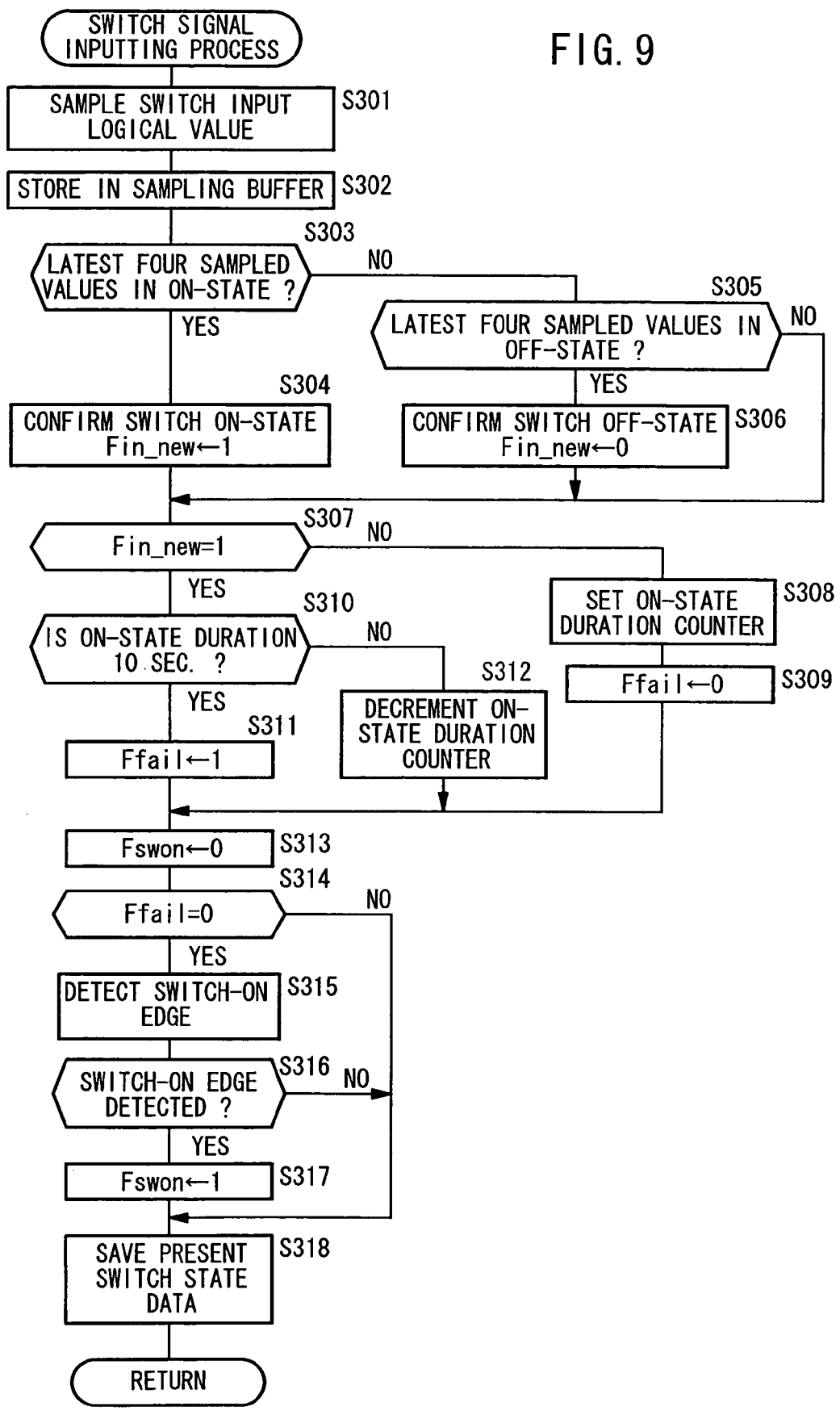
FIG. 9 is a flowchart of a switch signal inputting process in the main routine.

As shown in FIG. 9, a switch signal logic value is sampled in step S301. Specifically, the on or off state of the switch 44 is read through the input port P7.

In step S302, a parameter indicative of the on or off state of the switch 44 which is read in step S301 is stored into a sampling buffer.

In step S303, the values of parameters stored in the sampling buffer are checked. If the values of all the latest four parameters represent the on state of the switch 44, then control goes to step S304. If even one of the values of all the latest four parameters represents the off state of the switch 44, then control goes to step S305.

In step S304, a flag Fin_new indicative of the present state of the switch 44 is set to Fin_new←1, indicating that the switch 44 is turned on. Thereafter, control goes to step S307. In step S304, the on-state of the switch 44 is confirmed by the flag Fin_new set to Fin_new←1.

In step S305, the values of parameters stored in the sampling buffer are checked. If the values of all the latest four parameters represent the off state of the switch 44, then control goes to step S306. If even one of the values of all the latest four parameters represents the on state of the switch 44, then control goes to step S307.

In steps S303, S305, the flag Fin_new is set or reset only when the on or off state is confirmed in four successive cycles. Therefore, even if noise is applied to the input port P7, the grip heater controlling apparatus 10 is prevented from malfunctioning due to the noise.

In step S306, the flag Fin_new is set to Fin_new←0, indicating that the switch 44 is turned off. In step S306, the off-state of the switch 44 is confirmed by the flag Fin_new set to Fin_new←0.

In step S307, the value of the flag Fin_new is checked. If Fin_new=1, then control goes to step S310. If Fin_new=0, then control goes to step S308.

In step S308, the time counter Con which is to be decremented is set to Con←1000.

In step S309, a switch failure judging flag Ffail is reset to Ffail←0.

In step S310, it is checked if an on-state duration of the switch 44 has reached 10 sec. or not. Specifically, it is checked if the value of the time counter Con is 0 or not. If Con=0, then since on-state duration of the switch 44 has reached 10 sec., control goes to step S311. If Con>0, control goes to step S312.

In step S311, the switch failure judging flag Ffail is set to Ffail←1, indicating that the switch 44 is suffering a failure. That is, because the on-time of the switch 44 in a single turn-on cycle is usually less than 10 sec., the switch 44 can be judged as failing if it is continuously turned on for 10 sec.

In step S312, the timer counter Con is decremented by Con←Con←1.

In step S313 after steps S309, S311, S312, an on-edge detecting flag Fswon is reset to Fswon←0.

In step S314, the value of the switch failure judging flag Ffail is checked. If Ffail=0, then control goes to step S315. If Ffail=1, then control goes to step S318.

In step S315, a time at which the switch 44 is turned on successively four times or more after the switch 44 has been turned off successively four times or more is detected as a switch-on edge. Specifically, the flag Fin_new that is set and reset in steps S304, S306 and a flag Fin_old, which represents the value in a preceding cycle of the flag Fin_new, are exclusive-ORed, and the result of the exclusive-ORing process and the flag Fin_new are ANDed. The result of the ANDing process is put into a temporary flag Fa.

The above logical sequence is expressed by Fa← ((Fin_new) XOR (Fin_old)) AND (Fin_new).

In step S316, the value of the temporary flag Fa is checked. If Fa=1, then it indicates that a switch-on edge of the switch 44 is detected, and control goes to step S317. If Fa=0, then it indicates otherwise, and control goes to step S318.

In step S317, the on-edge detecting flag Fswon is set to Fswon←1.

In step S318, the present switch state data is saved. Specifically, the flag Fin_new is saved as Fin_old←Fin_new to Fin_old. After step S318, the subroutine of the switch signal inputting process is ended.

The subroutine of the grip heater current outputting process in step S5 (see FIG. 6) will be described below with reference to FIG. 10.

Figure 10:
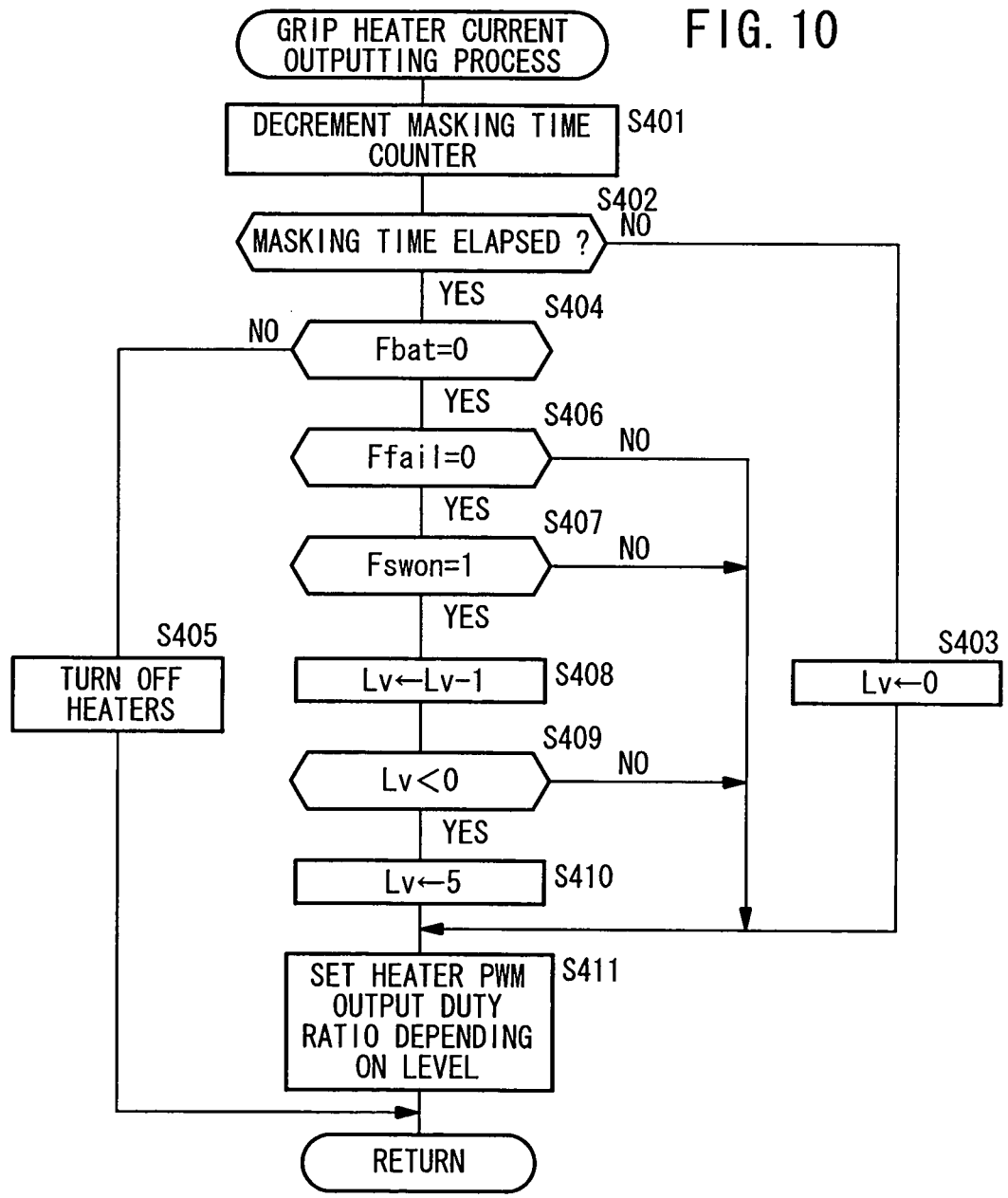
FIG. 10 is a flowchart of a grip heater current outputting process in the main routine.

As shown in FIG. 10, in step S401, the counter Cmsk for confirming a masking time which is initialized in step S101 is decremented (Cmsk←Cmsk←1) if Cmsk>0.

In step S402, it is determined whether a predetermined masking time has elapsed or not. Since the power supply voltage V0 may not be stable immediately after the ignition switch 70 is turned on, a masking process is performed to keep the grip heaters 52 de-energized even if the switch 44 is operated. Specifically, if the value of the counter Cmsk is 0, then it is judged that the masking time (e.g., 100 msec.) has elapsed, and control goes to step S404. If Cmsk>0, then it is judged that the masking time has not yet elapsed, and control goes to step S403.

In step S403, an amount-of-current level parameter Lv is reset to Lv←0. The amount-of-current level parameter Lv represents the level of an amount of current supplied to the grip heaters 52, and is cyclically set to six integers ranging from 0 to 5. Immediately after the ignition switch 70 is turned on, the amount-of-current level parameter Lv is set to 0. After step S403, control goes to step S411.

In step S404, the value of the voltage judging flag Fbat established in the power supply voltage detecting process (see FIG. 8) is checked. If Fbat=0, then control goes to step S406, indicating that the power supply voltage V0 is lowered. If Fbat=1, then control goes to step S405.

In step S405, the grip heaters 52 are de-energized. Specifically, a heater duty ratio value D1 for controlling the amount of current supplied to the grip heaters 52 is set to 0, turning off the grip heaters 52. Thereafter, the subroutine of the grip heater current outputting process in the present cycle is put to an end.

In step S405, the value of the amount-of-current level parameter Lv is maintained. Therefore, when the power supply voltage V0 returns to 12.8 V or higher again, the energization of the grip heaters 52 is automatically resumed based on the amount-of-current level parameter Lv at the time the power supply voltage V0 drops to 12.0 V or lower.

In step S406, the value of the switch failure judging flag Ffail established in the switch signal inputting process (see FIG. 9) is checked. If the switch 44 is judged as normal and Ffail=0, then control goes to step S407. If Ffail=1, then control goes to step S411.

If the switch 44 malfunctions and Fbat=1 judging from a matter of design, then control goes to step S405, turning off the grip heaters 52.

In step S407, the value of the on-edge detecting flag Fswon established in the switch signal inputting process (see FIG. 9) is checked. If a switch-on edge of the switch 44 is detected and Fswon=1, then control goes to step S408. Otherwise, control goes to step S411.

In step S408, the amount-of-current level parameter Lv is decremented to Lv←Lv←1.

In step S409, the value of the amount-of-current level parameter Lv is checked. If Lv<0, then control goes to step S410. Otherwise, control goes to step S411.

In step S410, the amount-of-current level parameter Lv is set to Lv←5. Thereafter, control goes to step S411.

In step S411, the heater duty ratio value D1 is set to a value depending on the six-stage value of the amount-of-current level parameter Lv. Specifically, if the amount-of-current level parameter Lv is 0, then the grip heaters 52 are to be turned off, and the duty ratio thereof is 0%. Therefore, the heater duty ratio value D1 is set to D1=0. If the amount-of-current level parameter Lv is 5, then the amount of current supplied to the grip heaters 52 is set to a maximum value, and the duty ratio thereof is 100%. Therefore, the heater duty ratio value D1 is set to D1=100.

The amount of current supplied to the grip heaters 52 is set a value depending on the six-stage value of the amount-of-current level parameter Lv. If the amount-of-current level parameter Lv is 4, 3, 2, and 1, the duty ratio of the grip heaters 52 is set to 80%, 60%, 40%, and 20%, respectively, and the heater duty ratio value D1 is set 80, 60, 40, and 20, respectively. Therefore, the heater duty ratio value D1 may be set to the same value as the duty ratio.

After step S411, the subroutine of the grip heater current outputting process is ended.

In the subroutine of the grip heater current outputting process, as described above, each time a switch-on edge of the switch 44 is detected, the amount-of-current level parameter Lv is cyclically set to 0→5→4→3→2→1→0 . . . .

Immediately after the ignition switch 70 is turned on, the amount-of-current level parameter Lv is Lv=0, and the grip heaters 52 do not start being energized against the will of the driver. Once the switch 44 is operated, the amount-of-current level parameter Lv is set to 5, and the amount of current supplied to the grip heaters 52 is maximized. Accordingly, the handle grips 18a, 18b can quickly be heated by a simple action.

Thereafter, when the driver feels adequately warm or slightly too hot on the handle grips 18a, 18b, since the amount-of-current level parameter Lv is set to 4, 3, 2, 1, 0, successively, each time the driver operates the switch 44, the amount of current supplied to the grip heaters 52 can be reduced as desired by the driver. If the driver wants to reheat the handle grips 18a, 18b, then the driver may operate the switch 44 to set the amount-of-current level parameter Lv to 5. As described later on, the driver can visually recognize the value of the amount-of-current level parameter Lv, i.e., the amount of current supplied to the grip heaters 52, with the light-emitting diodes LED1, LED2, LED3.

The driver can easily set the amount-of-current level parameter Lv by operating the single switch 44. Since the amount-of-current level parameter Lv is cyclically set to six values including 0, the grip heaters 52 can be energized and de-energized, and the amount of current supplied thereto can be adjusted, all by the single switch 44.

In the subroutine of the grip heater current outputting process, before the masking time elapses (Cmsk>0), when the power supply voltage V0 drops (Fbat=1), and the switch 44 fails (Ffail=1), any operation of the switch 44 is made invalid, thereby keeping the value of the amount-of-current level parameter Lv.

The subroutine of the indicator signal outputting process in step S6 (see FIG. 6) will be described below with reference to FIG. 11.

Figure 11:
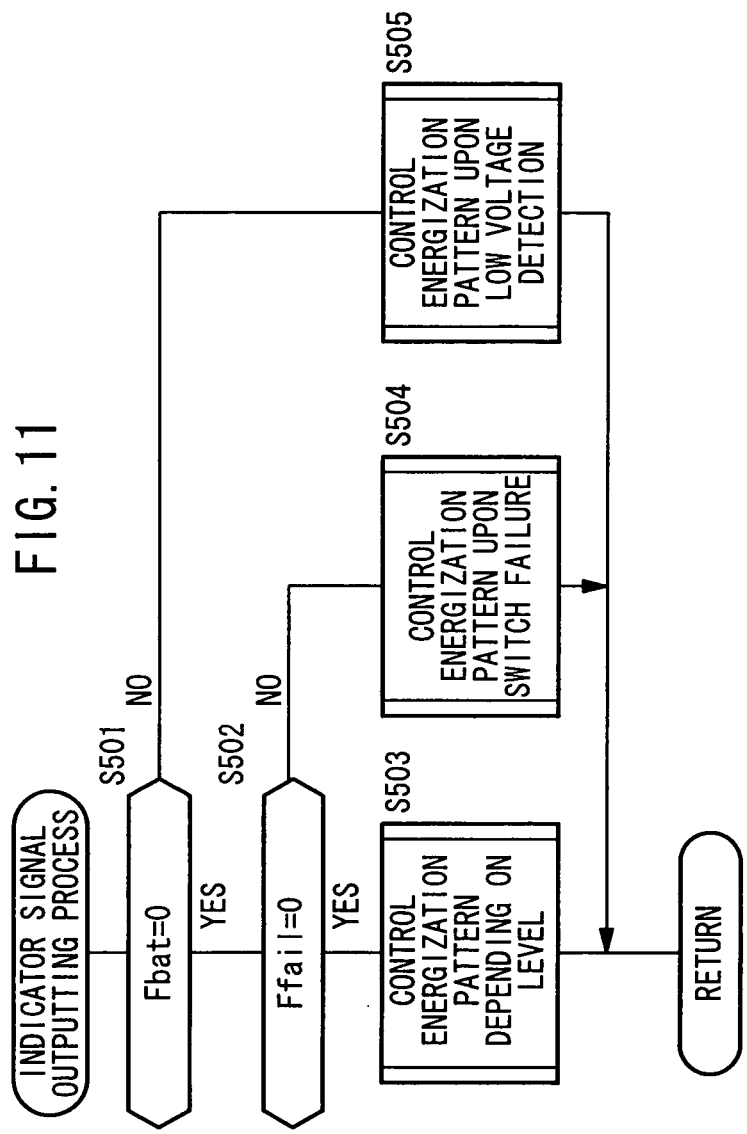
FIG. 11 is a flowchart of an indicator signal outputting process in the main routine.

As shown in FIG. 11, in step S501, the voltage judging flag Fbat established in the subroutine of the power supply voltage detecting process (see FIG. 8) is checked. If Fbat=0, then control goes to step S502. If Fbat=1, then control goes to step S505.

In step S502, the switch failure judging flag Ffail established in the subroutine of the switch signal inputting process (see FIG. 9) is checked. If Ffail=0, then control goes to step S503. If Ffail=1, then control goes to step S504.

In step S503, energization patterns of the light-emitting diodes LED1, LED2, LED3 are set depending on the value of the amount-of-current level parameter Lv established in the subroutine of the grip heater current outputting process (see FIG. 10). Specifically, a duty ratio value $D_{L1}$ representative of the energization pattern of the light-emitting diode LED1, a duty ratio value $D_{L2}$ representative of the energization pattern of the light-emitting diode LED2, and a duty ratio value $D_{L3}$ representative of the energization pattern of the light-emitting diode LED3 are set based on a table shown in FIG. 12.

Specifically, when the amount-of-current level parameter Lv is 0, the duty ratio values $D_{L1}$, $D_{L2}$, $D_{L3}$ are set to $D_{L1}$←0, $D_{L2}$←0, $D_{L3}$←0.

When the amount-of-current level parameter Lv is 5, the duty ratio values $D_{L1}$, $D_{L2}$, $D_{L3}$ are set to $D_{L1}$←100, $D_{L2}$←100, $D_{L3}$←100.

When the amount-of-current level parameter Lv is 4, the duty ratio values $D_{L1}$, $D_{L2}$, $D_{L3}$ are set to $D_{L1}$←10, $D_{L2}$←100, $D_{L3}$←100.

When the amount-of-current level parameter Lv is 3, the duty ratio values $D_{L1}$, $D_{L2}$, $D_{L3}$ are set to $D_{L1}$←0, $D_{L2}$←100, $D_{L3}$←100.

When the amount-of-current level parameter Lv is 2, the duty ratio values $D_{L1}$, $D_{L2}$, $D_{L3}$ are set to $D_{L1}$←0, $D_{L2}$←10, $D_{L3}$←100.

When the amount-of-current level parameter Lv is 1, the duty ratio values $D_{L1}$, $D_{L2}$, $D_{L3}$ are set to $D_{L1}$←0, $D_{L2}$←0, $D_{L3}$←100.

Figure 13:
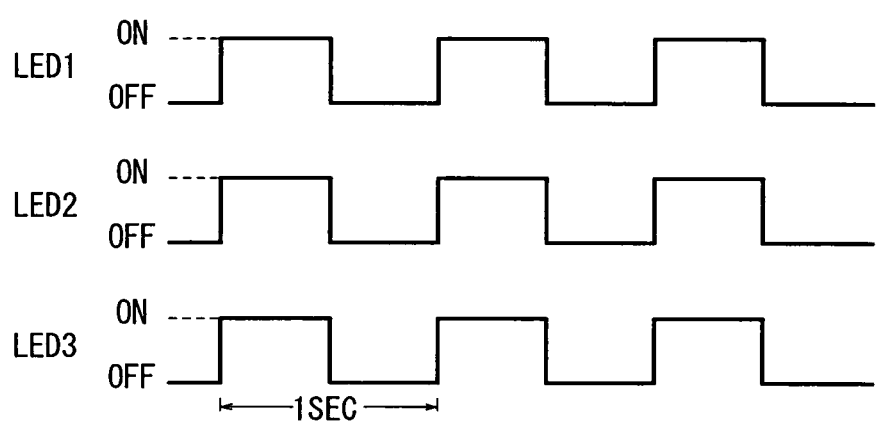
FIG. 13 is a timing chart showing an indicator on/off pattern at the time of a switch failure.

In step S504, the light-emitting diodes LED1, LED2, LED3 are flickered in periods of 1 sec. in a pattern indicating that the switch 44 is suffering a failure. Specifically, in successive 50 out of 100 cycles of step S504, the duty ratio values $D_{L1}$, $D_{L2}$, $D_{L3}$ are set to $D_{L1}$←0, $D_{L2}$←0, $D_{L3}$←0 to turn off the light-emitting diodes LED1, LED2, LED3, and in next successive 50 cycles, the duty ratio values $D_{L1}$, $D_{L2}$, $D_{L3}$ are set to $D_{L1}$←100, $D_{L2}$←100, $D_{L3}$←100, turning on the light-emitting diodes LED1, LED2, LED3. This process is repeated to cause the light-emitting diodes LED1, LED2, LED3 to be flickered repeatedly, i.e., turned on in 500 msec. of every 1 sec. and turned off in remaining 500 msec., as shown in FIG. 13.

Figure 14:
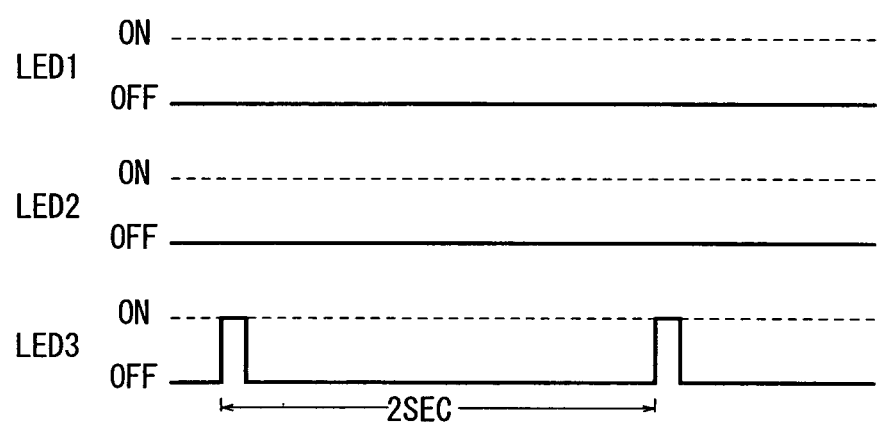
FIG. 14 is a timing chart showing an indicator on/off pattern at the time of a drop in the power supply voltage.

In step S505, the light-emitting diode LED3 is flickered in periods of 2 sec. in a pattern indicating that the power supply voltage V0 is lowered, and the light-emitting diodes LED1, LED2 are turned off. Specifically, the duty ratio values $D_{L1}$, $D_{L2}$ are set to $D_{L1}$←0, $D_{L2}$←0 to turn off the light-emitting diodes LED1, LED2. In successive 190 out of 200 cycles of step S505, the duty ratio value $D_{L3}$ is set to $D_{L3}$←0, turning off the light-emitting diode LED3, and in next successive 10 cycles, the duty ratio value $D_{L3}$ is set to $D_{L3}$←100, turning on the light-emitting diode LED3. This process is repeated to cause the light-emitting diode LED3 to be flickered repeatedly, i.e., turned on in 100 msec. of every 2 sec. and turned off in remaining 1900 msec., as shown in FIG. 14.

In steps S504, S505, inasmuch as those to be turned on and off of the light-emitting diodes LED1, LED2, LED3 and their energization patterns are clearly different from each other. Therefore, the driver can reliably distinguish a failure of the switch 44 and a reduction in the power supply voltage V from each other. The energization patterns of the light-emitting diodes LED1, LED2, LED3 while the grip heaters 52 are energized normally are turned on and off continuously, and are clearly different from the energization patterns thereof upon a failure of the switch 44 and a reduction in the power supply voltage V. Consequently, the driver can easily recognize a failure of the switch 44 and a reduction in the power supply voltage V from the light-emitting diodes LED1, LED2, LED3.

The timer routine which executed every 100 μsec. will be described below with reference to FIGS. 15 and 16.

Figure 15:
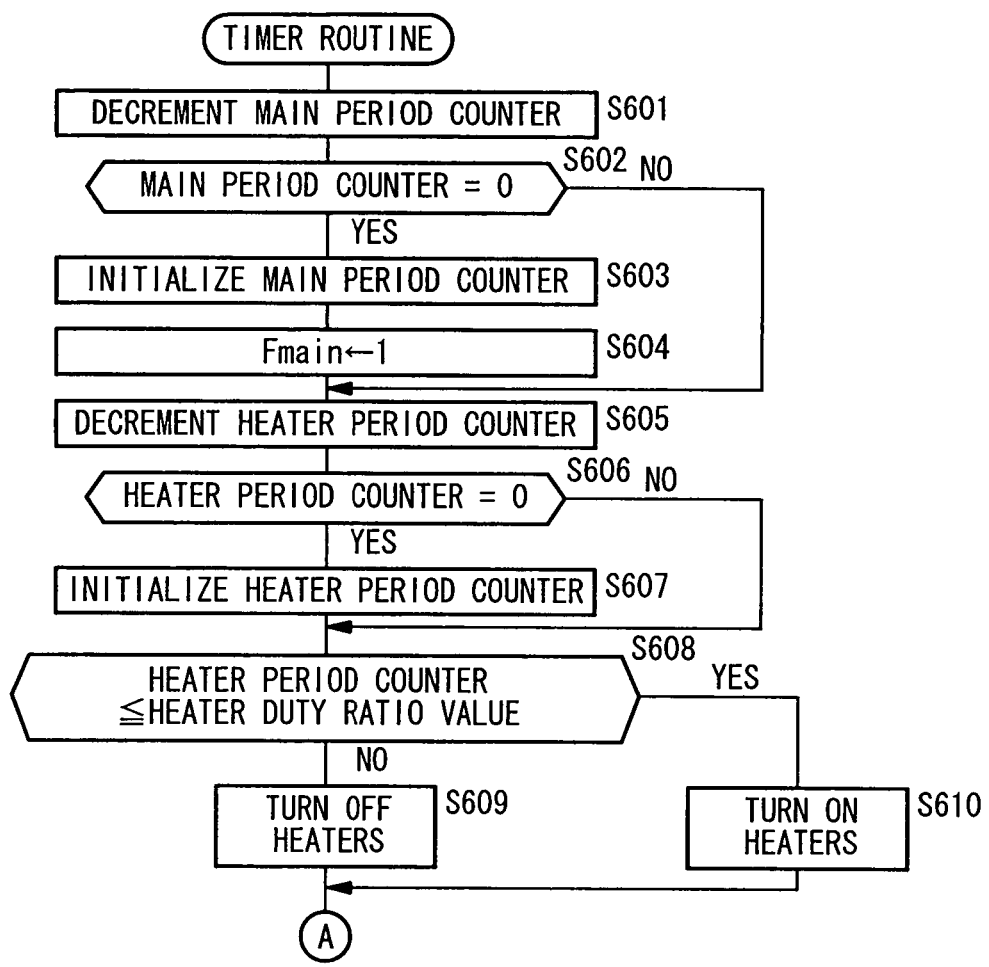
FIGS. 15 and 16 are a flowchart of a timer routine.

As shown in FIG. 15, in step S601, the main period counter Cmain for main routine control is decremented to Cmain←Cmain←1.

In step S602, the value of the main period counter Cmain is checked. If Cmain=0, control goes to step S603. If Cmain>0, then control goes to step S605.

In step S603, the main period counter Cmain is initialized again to Cmain←100.

In step S604, the main period monitoring flag Fmain is set to Fmain←1, allowing the main routine (see FIG. 6) to be executed. Steps S6 through S7 of the main routine are thus executed every 10 msec.

In step S605, the period counter Cpwm for heater control is decremented to Cpwm←Cpwm←1.

In step S606, the value of the period counter Cpwm is checked. If Cpwm=0, then control goes to step S607. If Cpwm>0, then control goes to step S608.

In step S607, the period counter Cpwm is initialized again to Cpwm←100.

In step S608, the value of the period counter Cpwm is compared with the heater duty ratio value D1. If Cpwm≤D1, then control goes to step S610. If Cpwm>D1, then control goes to step S609.

In step S609, the grip heaters 52 are de-energized. Specifically, the output port P4 outputs a signal to turn off the field-effect transistor 92, de-energizing the grip heaters 52.

In step S610, the grip heaters 52 are energized. Specifically, the output port P4 outputs a signal to turn on the field-effect transistor 92, energizing the grip heaters 52.

Figure 17:
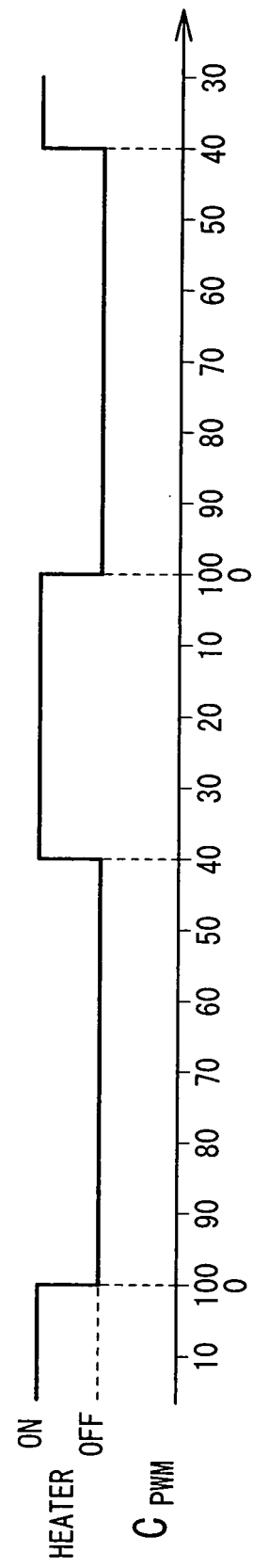
FIG. 17 is a timing chart showing the relationship between a current supplied to the heater when the duty ratio is 40% and the count of a heater control period counter.

If the heater duty ratio value D1 is 40, for example, then when 100≥Cpwm>40, as shown in FIG. 17, the grip heaters 52 are de-energized, and when 40≥Cpwm, the grip heaters 52 are energized at a duty ratio of 40%. If the heater duty ratio value D1 is 0, then the grip heaters 52 are de-energized. If the heater duty ratio value D1 is 20, 40, 60, 80, and 100, the grip heaters 52 are energized by corresponding currents (see FIG. 18).

Figure 16:
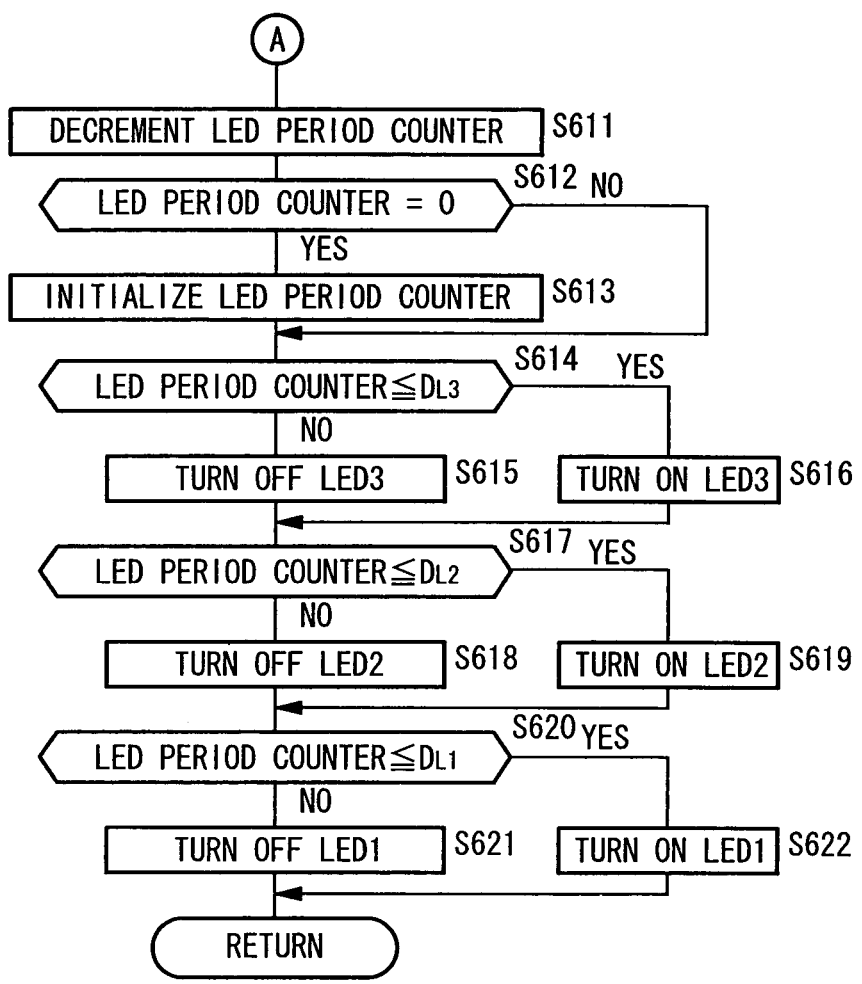

In step S611 shown in FIG. 16, the period counter CL for LED control is decremented to CL←CL←1.

In step S612, the value of the period counter CL is checked. If CL=0, control goes to step S613. If CL>0, then control goes to step S614.

In step S613, the period counter CL is initialized again to CL←100.

In step S614, the value of the period counter CL is compared with the duty ratio value $D_{L3}$ representative of the energization pattern of the light-emitting diode LED3. If CL≤$D_{L3}$, then control goes to step S616. If CL>$D_{L3}$, then control goes to step S615.

In step S615, the light-emitting diode LED3 is turned off. Specifically, the output port P3 outputs a signal to turn off the transistor 94c, turning off the light-emitting diode LED3. Thereafter, control goes to step S617.

In step S616, the light-emitting diode LED3 is turned on. Specifically, the output port P3 outputs a signal to turn on the transistor 94c, turning on the light-emitting diode LED3. Thereafter, control goes to step S617.

In step S617, the value of the period counter CL is compared with the duty ratio value $D_{L2}$ representative of the energization pattern of the light-emitting diode LED2. If CL≤$D_{L2}$, then control goes to step S619. If CL>$D_{L2}$, then control goes to step S618.

In step S618, the light-emitting diode LED2 is turned off. Specifically, the output port P2 outputs a signal to turn off the transistor 94b, turning off the light-emitting diode LED2. Thereafter, control goes to step S620.

In step S619, the light-emitting diode LED2 is turned on. Specifically, the output port P2 outputs a signal to turn on the transistor 94b, turning on the light-emitting diode LED2. Thereafter, control goes to step S620.

In step S620, the value of the period counter CL is compared with the duty ratio value $D_{L1}$ representative of the energization pattern of the light-emitting diode LED1. If CL≤$D_{L1}$, then control goes to step S622. If CL>$D_{L1}$, then control goes to step S621.

In step S621, the light-emitting diode LED1 is turned off. Specifically, the output port P1 outputs a signal to turn off the transistor 94a, turning off the light-emitting diode LED1.

In step S622, the light-emitting diode LED1 is turned on. Specifically, the output port P1 outputs a signal to turn on the transistor 94a, turning on the light-emitting diode LED1.

In the timer routine, as described above, the execution of the main routine is permitted based on the main period counter Cmain, and the amounts of current supplied to the grip heaters 52 and the light-emitting diodes LED1, LED2, LED3 are controlled based on the value of the period counter Cpwm for heater control and the value of the period counter CL for LED control.

To determine the amounts of current supplied to the grip heaters 52 and light-emitting diodes LED1, LED2, LED3, duty ratios thereof are determined based on the heater duty ratio value D1, the duty ratio value $D_{L1}$, the duty ratio value $D_{L2}$, and the duty ratio value $D_{L3}$. Then, currents depending on the amount-of-current level parameter Lv, as shown in FIG. 18, are supplied to the light-emitting diodes LED1, LED2, LED3. In FIG. 18, the period T is set to 10 msec., as described above.

In a row showing how the light-emitting diodes LED1, LED2, LED3 are turned on and off in FIG. 18, "O" indicates that the light-emitting diode is fully turned on, "x" indicates that the light-emitting diode is turned off, and "Δ" indicates that the light-emitting diode is turned on at an intermediate luminance level. The light-emitting diodes LED1, LED2, LED3 are fully turned on, turned off, and turned on at an intermediate luminance level based on the duty ratio value $D_{L1}$, the duty ratio value $D_{L2}$, and the duty ratio value $D_{L3}$ that are set in step S503.

Specifically, when the amount-of-current level parameter Lv is 0, all the light-emitting diodes LED1, LED2, LED3 are turned off.

When the amount-of-current level parameter Lv is 5, all the light-emitting diodes LED1, LED2, LED3 are fully turned on.

When the amount-of-current level parameter Lv is 4, since the duty ratio of the light-emitting diode LED1 is set to 10% based on the duty ratio value $D_{L1}$, the light-emitting diode LED1 is turned on at an intermediate luminance level, and the light-emitting diodes LED2, LED3 are fully turned on. As the light-emitting diode LED1 is turned on at an intermediate luminance level based on the duty ratio of 10%, it can clearly be visually distinguished from the light-emitting diodes LED2, LED3 that are fully turned on, and can still reliably be visually perceived as being turned on. As a result, the driver can easily recognize the light-emitting diode LED1 as being turned on at an intermediate luminance level. Actually, the duty ratio for turning on a light-emitting diode may be set to a value in the range from 5 to 20%. The light-emitting diode LED2 is similarly turned on when the amount-of-current level parameter Lv is 2.

When the amount-of-current level parameter Lv is 3, the light-emitting diode LED1 is turned off, and the light-emitting diodes LED2, LED3 are fully turned on.

When the amount-of-current level parameter Lv is 2, the light-emitting diode LED1 is turned off, the light-emitting diode LED2 is turned on at an intermediate luminance level because the duty ratio thereof is set to 10% based on the duty ratio value $D_{L2}$, and the light-emitting diode LED3 is fully turned on.

When the amount-of-current level parameter Lv is 1, the light-emitting diodes LED1, LED2 are turned off, and the light-emitting diode LED3 is fully turned on.

By thus individually fully turning on, fully turning off, and turning on at an intermediate luminance level the light-emitting diodes LED1, LED2, LED3, the six levels of the amount-of-current level parameter Lv can be expressed by the three light-emitting diodes. Since the indicator 45 has the three light-emitting diodes LED1, LED2, LED3, it can present eight combinations. Even if no intermediate luminance level turn-ons are employed, the indicator 45 can display six levels distinguishably.

However, if the light-emitting diodes LED1, LED3 are turned on and the light-emitting diode LED2 is turned off, for example, then the driver is unable to grasp the amount-of-current level intuitively. According to the present embodiment, when at least one of the light-emitting diodes LED1, LED2, LED3 is turned on at an intermediate luminance level, the driver can recognize the amount-of-current level intuitively. Specifically, since the light-emitting diodes LED1, LED2, LED3 are arrayed in line and are successively turned on at an intermediate luminance level or fully turned on from an end of the array depending on the amount-of-current level. As a consequence, the light-emitting diodes as they are turned on are visually recognized as an elongate array of bright dots which looks like a bar graph, and the number of successive light-emitting diodes that are turned on at an intermediate luminance level or fully turned on gives the driver an intuitive grasp of the amount-of-current level. Furthermore, an array of bright dots (a bar graph) produced by light-emitting diodes that are turned on which includes a light-emitting diode that is fully turned on at an end of the array enables the driver to recognize a higher amount-of-current level than an array of as many bright dots produced by light-emitting diodes that are turned on which includes a light-emitting diode that is turned on at an intermediate luminance level at an end of the array.

According to the present embodiment, the amount-of-current level parameter Lv takes six values from 0 to 5. If the light-emitting diode LED3 is also turned on at an intermediate luminance level, then the amount-of-current level parameter Lv can be set to seven values, which allow practically sufficient levels to be displayed for identification. With such intermediate luminance level turn-ons, only three light-emitting diodes LED1, LED2, LED3 are sufficient, making the housing inexpensive to manufacture and small in size, and allowing the indicator 45 to consume reduced electric power.

The number of values that amount-of-current level parameter Lv takes may be three including 0. According to such a modification, the light-emitting diode LED1 may be dispensed with, and the light-emitting diodes LED2, LED3 may be turned off when the amount-of-current level parameter Lv is 0, the light-emitting diodes LED2, LED3 may be fully turned on when the amount-of-current level parameter Lv is 2, and the light-emitting diode LED2 may be turned off and the light-emitting diode LED3 may be fully turned on when the amount-of-current level parameter Lv is 1. Furthermore, when the amount-of-current level parameter Lv is 0, 2, and 1, the heater duty ratio value D1 may be set, for example, to 0%, 100%, and 50%, respectively.

Actually, if the number of values that amount-of-current level parameter Lv takes is two, then it switches between on and off states only, and it is unable to adjust the amount of current. If the number of values that amount-of-current level parameter Lv takes is too large, the switch 44 needs to be operated too often for adjusting the amount of current and de-energizing the grip heaters 52, and hence the operation of the switch 44 becomes complicated and time-consuming. Therefore, the number of values that amount-of-current level parameter Lv takes should appropriately be in the range from three to seven.

As described above, with the grip heater controlling apparatus 10 according to the present embodiment, since the amount-of-current level parameter Lv is cyclically changed to six levels including "O" which indicates the de-energization of the grip heaters 52, depending on the number of times that the momentary switch 44 is operated, the amount of current supplied to the grip heaters 52 can easily be controlled.

In the initial state when the ignition switch 70 is turned on, since the amount of current supplied to the grip heaters 52 is 0, the grip heaters 52 do not start being energized against the will of the driver. When the switch 44 is operated once in the initial state, the amount-of-current level parameter Lv is set to 5, the amount of current supplied to the grip heaters 52 is maximized. Accordingly, the handle grips 18a, 18b can quickly be heated by a simple action.

Figure 19:
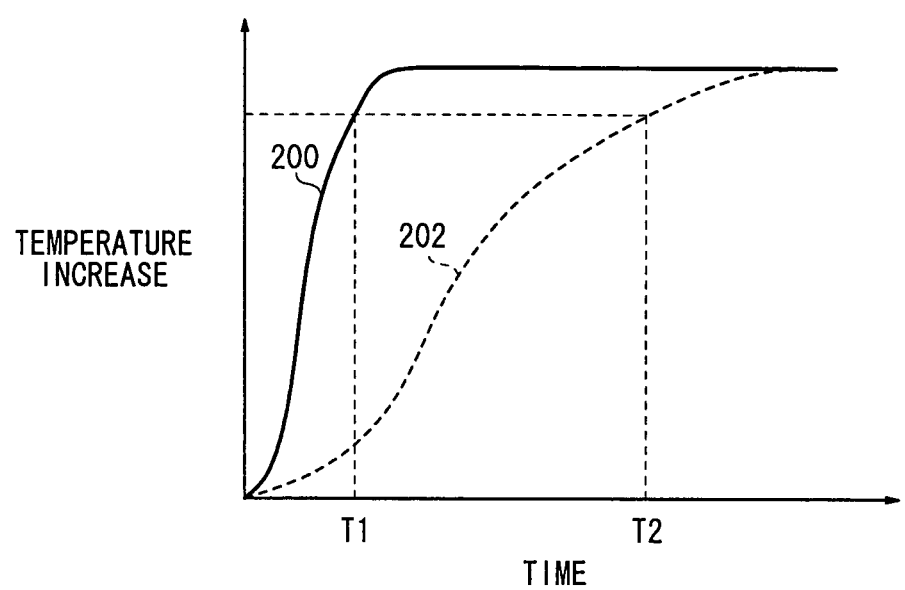
FIG. 19 is a graph showing temperature increasing characteristics of the heater whose heater element is made of stainless steel foil.

Because the heater element 62 (see FIG. 4) of the grip heaters 52 is made of stainless steel foil, the temperature thereof can rapidly be increased to heat the handle grips 18a, 18b quickly. Specifically, as shown in FIG. 19, a temperature increase caused by the heater element 62 made of stainless steel foil is represented by the solid-line curve 200. The temperature increase has a rise time T1, which is measured according to predetermined standards, that is about one-quarter of a rise time T2 of a temperature increase (represented by the broken-line curve 202) caused by a heater element made of copper foil.

When the power supply voltage V0 drops to the threshold Vth2 (12.0 V) or less, the grip heater controlling apparatus 10 according to the present embodiment stops energizing the grip heaters 52. Therefore, a current load on the battery 34 and the alternator 76, i.e., the power supply, is reduced. Particularly, when the motorcycle 12 is started at low temperatures, the capacity of the battery 34 tends to low, and the grip heaters 52 are usually used at low temperatures. Consequently, at low temperatures, the battery 34 tends to suffer an increased current load as it needs to supply currents to a starter motor (not shown) and the grip heaters 52. In this case, the grip heater controlling apparatus 10 detects a reduction in the power supply voltage V0 and turns off the grip heaters 52. Consequently, the motorcycle 12 maintains its ability to be started at low temperatures.

Furthermore, since the grip heater controlling apparatus 10 is operated by the single momentary switch 44, it can be operated highly simply. The grip heater controlling apparatus 10 can be operated even if it is covered with a handle cover or the like. The switch 44 is simpler, more reliable and durable, and more inexpensive than potentiometers or the like. The switch 44 may be made lower in profile than potentiometers or the like, making it possible to construct the grip heater controlling apparatus 10 as a compact unit.

The indicator 45 may comprise liquid-crystal display elements rather than light-emitting diodes.

Although a certain preferred embodiment of the present invention has been shown and described in detail, it should be understood that various changes and modifications may be made therein without departing from the scope of the appended claims.

What is claimed is:

1. A grip heater controlling apparatus, comprising:
a grip heater mounted on a steering handle of a vehicle;
a single momentary switch directly operable by a driver of the vehicle;
an amount-of-current controller for changing an amount-of-current level to the grip heater cyclically to at least three levels depending on a number of times that said single momentary switch is operated, said at least three levels include at least a maximum current level, a minimum current level and intermediate current levels;
an interface circuit connected between said single momentary switch and said amount-of-current controller, said interface circuit consisting of a pull-up resistor and a filter for stabilizing a signal from said single momentary switch, wherein said filter consisting of a capacitor and a resistor and said interface circuit is connected to an input port of said amount-of-current controller to provide said signal from said single momentary switch after said signal has passed through said filter;
an indicator for indicating the amount-of-current level, said indicator comprises fewer light-emitting elements than said at least three levels; and
a plurality of emitter-grounded transistors each of which communicates to a light-emitting element of the light-emitting elements,
wherein said amount-of-current controller supplies current to each of the plurality of emitter-grounded transistors for energizing the corresponding light-emitting elements of the indicator,
wherein the maximum current level is indicated by having all of said light-emitting elements fully turned on, the minimum current level is indicated by having all of said light-emitting elements turned off, the intermediate current levels are indicated by a combination of the light-emitting elements that are fully turned on, the light-emitting elements that are turned off and the light-emitting elements that are at an intermediate luminance level,
wherein the intermediate current levels having at least one combination of the light-emitting elements that is indicated by having one light-emitting element that is at the intermediate luminance level and the remaining light-emitting elements that are fully turned on,
wherein in an initial state when a power supply switch of the vehicle is turned on, said amount-of-current controller minimizes the amount-of-current level, and when said single momentary switch is operated once in said initial state, said amount-of-current controller maximizes the amount-of-current level,
wherein when the amount-of-current level is at a maximum, the amount-of-current level is reduced in stages each time said single momentary switch is operated.

2. The apparatus according to claim 1, wherein
an array of the light-emitting elements are in line and are successively turned on at an intermediate luminance level or fully turned on from an end of the array depending on the amount-of-current level, and the array of light-emitting elements that are turned on which includes a light-emitting element that is fully turned on at the end of the array enables the driver to recognize a higher amount-of-current level than the array of light emitting elements that are turned on which includes a light-emitting element that is turned on at an intermediate luminance level at an end of the array.

3. The apparatus according to claim 2, wherein the array of the light-emitting elements, which are in line, having a base end and a high end in which a light-emitting element of the array at the base end, which is opposite to the high end of the array of the light-emitting elements, is fully turned on when the amount-of-current level is at the maximum current level and the intermediate current level, and is fully turned off when the amount-of-current level is at the minimum current level.

4. The apparatus according to claim 1, wherein said vehicle has a speedometer and a handle grip, further comprising a unit disposed between said speedometer and said handle grip, said single momentary switch and said indicator being mounted on said unit, said single momentary switch being positioned more closely to said handle grip than said indicator.

5. The apparatus according to claim 1, wherein said indicator comprises an array of said light-emitting elements, and said light-emitting elements are successively turned on at said intermediate luminance level or fully turned on from an end of said array depending on said levels.

6. The apparatus according to claim 1, wherein said light-emitting elements comprise three light-emitting elements.

7. The apparatus according to claim 1, wherein said light-emitting elements are adjusted in luminance under pulse width modulation control, and turned on at said intermediate luminance level at a duty ratio ranging from 5 to 20%.

8. The apparatus according to claim 1, wherein said amount-of-current controller has a voltage monitor for detecting a power supply voltage of said power supply, and said amount-of-current controller minimizes the amount of current level when said power supply voltage as detected by said voltage monitor is equal to or less than a first threshold.

9. The apparatus according to claim 8, wherein said amount-of-current controller automatically resumes energization of said grip heater based on said at least three levels when said power supply voltage returns to a second threshold larger than said first threshold.

10. The apparatus according to claim 8,
wherein said amount-of-current controller continuously turns on or off said indicator to indicate said amount of current level when said power supply voltage exceeds a second threshold larger than said first threshold, and flickers at least a portion of said indicator when said power supply voltage is equal to or less than said first threshold.

11. The apparatus according to claim 1,
wherein said amount-of-current controller changes said amount of current level and continuously turns on or off said indicator to indicate said amount of current level when the on-time of said single momentary switch in a single turn-on cycle is less than a predetermined time, and flickers at least a portion of said indicator when the on-time of said single momentary switch in the single turn-on cycle is equal to or longer than said predetermined time.

12. The apparatus according to claim 1, wherein at least three levels comprise a range from three to seven levels.

13. The apparatus according to claim 1, wherein said amount-of-current controller performs a masking process to make any operation of said single momentary switch invalid within a predetermined time after a power supply switch of the vehicle is turned on.

14. A method of controlling a grip heater controlling apparatus, comprising the steps of:
  using a single momentary switch operable by a driver of a vehicle;
  changing an amount-of-current level cyclically to at least three levels depending on a number of times that said single momentary switch is operated, said at least three levels include at least a maximum current level, a minimum current level and intermediate current levels; and
  indicating the amount-of-current level in an indicator that is controlled by an amount-of-current controller, said indicator comprises fewer light-emitting elements than said at least three levels;
  stabilizing a signal from said single momentary switch by connecting an interface circuit between said single momentary switch and said amount-of-current controller, said interface circuit consisting of a pull-up resistor and a filter, said filter consisting of a capacitor and a resistor wherein said interface circuit is connected to an input port of said amount-of-current controller to provide said signal from said single momentary switch after said signal has passed through said filter;
  supplying current to each of a plurality of emitter-grounded transistors, each of which communicates to a light-emitting element of the light-emitting elements, for energizing the corresponding light-emitting elements of the indicator,
  wherein the maximum current level is indicated by having all of said light-emitting elements fully turned on, the minimum current level is indicated by having all of said light-emitting elements turned off and the intermediate current levels are indicated by a combination of the light-emitting elements that are fully turned on, the light-emitting elements that are turned off and the light-emitting elements that are at an intermediate luminance level,
  wherein the intermediate current levels having at least one combination of the light-emitting elements that is indicated by having one light-emitting element that is at the intermediate luminance level and the remaining light-emitting elements that are fully turned on.

15. The method according to claim 14, further comprising the steps of:
  setting the amount-of-current level to 0 when a power supply switch of the vehicle is turned on; and
  maximizing the amount-of-current level when said single momentary switch is operated once in said initial state.

* * * * *